US010326845B1

(12) United States Patent
Jaeger

(10) Patent No.: US 10,326,845 B1
(45) Date of Patent: Jun. 18, 2019

(54) MULTI-LAYER APPLICATION MANAGEMENT ARCHITECTURE FOR CLOUD-BASED INFORMATION PROCESSING SYSTEMS

(71) Applicant: Virtustream IP Holding Company LLC, Bethesda, MD (US)

(72) Inventor: Peter Jaeger, Sandy Springs, GA (US)

(73) Assignee: Virtustream IP Holding Company LLC, Bethesda, MD (US)

( * ) Notice: Subject to any disclaimer, the term of this patent is extended or adjusted under 35 U.S.C. 154(b) by 283 days.

(21) Appl. No.: 15/195,159

(22) Filed: Jun. 28, 2016

(51) Int. Cl.
    *H04L 12/24* (2006.01)
    *H04L 12/911* (2013.01)
    *H04L 29/08* (2006.01)

(52) U.S. Cl.
    CPC ............ *H04L 67/16* (2013.01); *H04L 41/022* (2013.01); *H04L 41/0803* (2013.01); *H04L 47/78* (2013.01); *H04L 67/02* (2013.01)

(58) Field of Classification Search
    CPC .... H04L 41/0803; H04L 41/022; H04L 47/78
    See application file for complete search history.

(56) References Cited

U.S. PATENT DOCUMENTS

| | | | | |
|---|---|---|---|---|
| 2002/0147854 | A1* | 10/2002 | Frazier | G06F 9/545 719/310 |
| 2002/0174107 | A1* | 11/2002 | Poulin | G06F 17/30864 |
| 2016/0094402 | A1* | 3/2016 | Finkelstein | H04L 41/0803 709/226 |

OTHER PUBLICATIONS

Solarwinds Worldwide, LLC, "Application Stack Management Bundle: Pinpoint the Root Cause of Application Problems in Seconds," http://www.solarwinds.com/application-server-management-software, 2016, 4 pages.
Zoho Corporation, "ManageEngine Applications Manager-Fact Sheet," https://download.manageengine.com/products/applications_manager/meam_fact_sheet.pdf, 2016, 4 pages.
The Apache Software Foundation, "Apache CloudStack: About," https://cloudstack.apache.org/about.html, 2016, 1 page.

(Continued)

*Primary Examiner* — Philip J Chea
*Assistant Examiner* — Mohammed Ahmed
(74) *Attorney, Agent, or Firm* — Ryan, Mason & Lewis, LLP

(57) ABSTRACT

An apparatus in one embodiment comprises a processing platform that includes a plurality of processing devices each comprising a processor coupled to a memory. The processing platform is configured to implement virtual resources of one or more clouds for use by applications of at least one application management domain. The processing platform further comprises an application manager configured in accordance with a multi-layer application management architecture including at least a component control layer, a system control and inner orchestration layer, an access and routing layer, an external system orchestration layer, and a presentation layer. The virtual resources and applications comprise respective controlled components under control of the component control layer. The applications are managed utilizing interactions between the layers of the multi-layer application management architecture, such as interactions between inner orchestration engines of the system control and inner orchestration layer and controllers of the component control layer.

17 Claims, 19 Drawing Sheets

(56) References Cited

OTHER PUBLICATIONS

Kaavo, "Application-Centric Cloud Resource Management," IMOD Data Sheet, http://docs.kaavo.com/Kaavo-IMOD-Fact-Sheet.pdf, 2011, 2 pages.
Morpheus Data, LLC, "Cloud Application Management for Today's Technology Leader," https://morpheus-v2-marketing-production.s3.amazonaws.com/system/SpudMedia/216/attachment/Morpheus_Overview_original.pdf, Jul. 8, 2016, 2 pages.
Rightscale, Inc., "RightScale Technical Overview," http://assets.rightscale.com/uploads/pdfs/RightScale-Technical-overview.pdf, 2014, 11 pages.
Activeeon, "ProActive Cloud Automation: Your Open Automation Platform, Product Sheet," http://www.activeeon.com/resources/activeeon-productsheet-proactive-cloud-automation-en.pdf, 2016, 2 pages.
VMware, "VMware vRealize Orchestrator: Executing Complex IT Operations Faster and at Lower Cost," Datasheet, https://www.vmware.com/content/dam/digitalmarketing/vmware/en/pdf/products/vrealize/vmware-vrealize-orchestrator.pdf, Sep. 2014, 2 pages.
The Apache Software Foundation, "The Theory Behind Brooklyn," https://brooklyn.apache.org/learnmore/theory.html, 2016, 4 pages.
The Apache Software Foundation, "Apache Provisionr," http://provisionr.incubator.apache.org/index.html, 2013, 1 page.
J. Cammarata, "About Cobbler," http://cobbler.github.io/about.html, 2016, 3 pages.
Canonical Ltd., "What is Juju?," https://jujucharms.com/docs/stable/about-juju, 2016, 6 pages.
Saltstack Inc., "SaltStack Orchestration & Automation for CloudOps, ITops & DevOps at Scale," https://saltstack.com/enterprise/, 2016, 3 pages.
Empirius GMBH, "Technical Whitepaper: BlueSystemCopy for SAP," http://empirius.de/en/products/blue-systemcopy-systemcopies-automatic-and-optimized.html, Aug. 2016. 17 pages.
Libelle AG, "Libelle SystemCopy: Automated and Optimized System Copies for SAP Applications," Fact Sheet, http://www.libelle.com/fileadmin/Public/Whitepaper/FactSheet_Libelle_SystemCopy_EN.pdf, Apr. 2015, 4 pages.
Cloud Foundry Foundation, "Cloud Foundry Overview," https://docs.cloudfoundry.org/concepts/overview.html, Jul. 27, 2016, 4 pages.
Heroku Dev Center, "How Heroku Works," https://devcenter.heroku.com/articles/how-heroku-works#defining-an-application, Aug. 26, 2016, 10 pages.
Apcera Inc., "How Apcera Works," http://docs.apcera.com/introduction/apcera-usage/, Nov. 4, 2015, 4 pages.
Kubernetes, "What is Kubernetes?," http://kubernetes.io/docs/whatisk8s/, 2016, 6 pages.
Usharesoft, "UForge for Cloud Service Providers Scale. Differentiate. Make Money. Solution Sheet," https://www.usharesoft.com/resources/datasheets/uforge-cloud-providers.pdf, 2014, 2 pages.
Gigaspaces Technologies, "What is Cloudify?," http://docs.getcloudify.org/3.3.1/intro/what-is-cloudify/, 2016, 2 pages.
CLIQR Technologies, "CloudCenter Features," http://docs.cliqr.com/display/CCD42/Features, 2016, 2 pages.
Red Hat, Inc., "Ansible Tower User Guide v3.0.1," https://docs.ansible.com/ansible-tower/latest/html/userguide/overview.html, 2016, 3 pages.
CHEF Software Inc., "CHEF" DataSheet, https://pages.chef.io/rs/255-VFB-268/images/chef-datasheet.pdf, Jun. 2016, 2 pages.
CFengine, "Introduction and System Overview," https://docs.cfengine.com/lts/guide-introduction.html, Sep. 28, 2016, 5 pages.
Incontinuum, "Automated Cloud Orchestration," http://incontinuum.incontinuumsoftw.netdna-cdn.com/wp-content/uploads/2016/07/CloudController-EN-1606-BROCHURE.pdf, Jun. 2016, 4 pages.
Apprenda Inc., "What is Apprenda, Logically Speaking?" http://docs.apprenda.com/print/book/export/html/976, 2016, 4 pages.
Fluid Operations AG, "Next Generation Cloud Management," https://www.fluidops.com/en/company/post?s=2016-03-30-new-paper-available-next-generation-cloud-management, Mar. 30, 2016, 12 pages.
VMware, Inc., "VMware vCloud Air: Service Description," Datasheet, http://www.vmware.com/content/dam/digitalmarketing/vmware/en/pdf/product/vcloud-air/vmware-vcloud-air-datasheet.pdf, 2015, 4 pages.
Red Hat, Inc., "Openshift Enterprise 3.1 by Red Hat," Datasheet, https://www.openshift.com/sites/default/files/rhc-openshift-enterprise-paas-datasheet.pdf, 2015, 2 pages.
IBM Corporation Software Group, "Simplifying Cloud Management and Data Center Automation," Thought Leadership White Paper, http://www-03.ibm.com/software/products/en/ibm-cloud-orchestrator, Apr. 2014, 6 pages.
Rackspace US, Inc., "Why Rackspace: More Than a Hosting Provider. We're your Trusted Service Partner," https://www.rackspace.com/why-rackspace, 2016, 6 pages.
Hashicorp, "DevOps and the Future of Infrastructure," https://www.hashicorp.com/index.html#products, 2016, 10 pages.
C3DNA Inc., "The C3DNA Platform," http://c3dna.com/product.html, 2014, 5 pages.
IT-Conductor Inc., "Application Performance Management as Service," http://itconductor.com/, 2016, 7 pages.
Elasticbox, "Adaptive Cloud Application Delivery," https://elasticbox.com/how-it-works, 2016, 5 pages.
Hashicorp, "Why Vagrant?," https://www.vagrantup.com/docs/why-vagrant/, Jan. 19, 2016, 3 pages.
Hewlett Packard Enterprise Development LP, "Eucalyptus 4.3.0 User Guide," https://docs.eucalyptus.com/eucalyptus/4.3.0/, Sep. 23, 2016, 127 pages.
Puppet, "Explore the Value of Puppet Enterprise," https://puppet.com/resources/data-sheet/explore-value-of-puppet-enterprise, 2016, 2 pages.
Rackspace US, Inc., "Welcome to the Heat Documentation!," OpenStack Heat, http://docs.openstack.org/developer/heat, 2013, 5 pages.
EMC Corporation, "VCE VXRack System 1000 Series: Hyper-Converged Infrastructure at Scale," The Virtual Computing Environment Company, EMC Converged Platforms, Feb. 17, 2016, 3 pages.
sysdig.org, "Universal System Visibility with Native Container Support," 2015, 3 pages.
W. Felter et al., "An Updated Performance Comparison of Virtual Machines and Linux Containers," IBM Research Report, RC25482, Jul. 21, 2014, 15 pages.
EMC Corporation, "Vblock FastPath Desktop Virtualization Platform: Modernize Your Desktop with a Purpose-Built Desktop Virtualization Solution," The Virtual Computing Environment Company, vmware, 2011, 2 pages.
B. Hindman et al., "Mesos: A Platform for Fine-Grained Resource Sharing in the Data Center," Proceedings of the 8th USENIX Conference on Networked Systems Design and Implementation (NSDI), Mar.-Apr. 2011, pp. 295-308.
wordpress.com, "Virtustream xStream with App Director Service Module for SAP," The SAP Data Center of the Future, Apr. 14, 2016, 5 pages.

* cited by examiner

US 10,326,845 B1

MULTI-LAYER APPLICATION MANAGEMENT ARCHITECTURE FOR CLOUD-BASED INFORMATION PROCESSING SYSTEMS

FIELD

The field relates generally to information processing systems, and more particularly to techniques for managing applications in cloud-based information processing systems.

BACKGROUND

Information processing systems increasingly utilize reconfigurable virtual resources to meet changing user needs in an efficient, flexible and cost-effective manner. For example, cloud computing and storage systems implemented using virtual resources have been widely adopted. Other virtual resources now coming into widespread use in information processing systems include Linux containers. Such containers may be used to provide at least a portion of the virtualization infrastructure of a given cloud-based information processing system. However, significant challenges can arise in the management of large numbers of applications in cloud-based information processing systems. For example, coordination of multiple distinct applications on behalf of each of multiple tenants across a hybrid multi-tenant cloud can be particularly challenging when using conventional arrangements. Accordingly, a need exists for improved management of applications in hybrid multi-tenant clouds as well as other types of cloud-based information processing systems.

SUMMARY

Illustrative embodiments of the present invention provide multi-layer application management architectures for cloud-based information processing systems. Such architectures are well-suited for use with hybrid multi-tenant clouds and numerous other types of cloud-based information processing systems.

In one embodiment, an apparatus comprises a processing platform that includes a plurality of processing devices each comprising a processor coupled to a memory. The processing platform is configured to implement virtual resources of one or more clouds for use by applications of at least one application management domain. The processing platform further comprises an application manager configured in accordance with a multi-layer application management architecture including at least a component control layer, a system control and inner orchestration layer, an access and routing layer, an external system orchestration layer, and a presentation layer. The virtual resources and applications comprise respective controlled components under control of the component control layer. The applications are managed utilizing interactions between the layers of the multi-layer application management architecture. For example, the system control and inner orchestration layer may comprise at least one inner orchestration engine configured to interact with a plurality of controllers of the component control layer in order to provide particular services.

Illustrative embodiments can provide significant advantages relative to conventional arrangements. For example, challenges associated with deployment of multiple distinct applications for multiple tenants in hybrid multi-tenant clouds can be advantageously avoided through the use of an application manager configured in accordance with a multi-layer application management architecture as disclosed herein.

These and other illustrative embodiments described herein include, without limitation, methods, apparatus, systems, and computer program products comprising processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Numerous other system configurations are possible in other embodiments.

Figure 1:
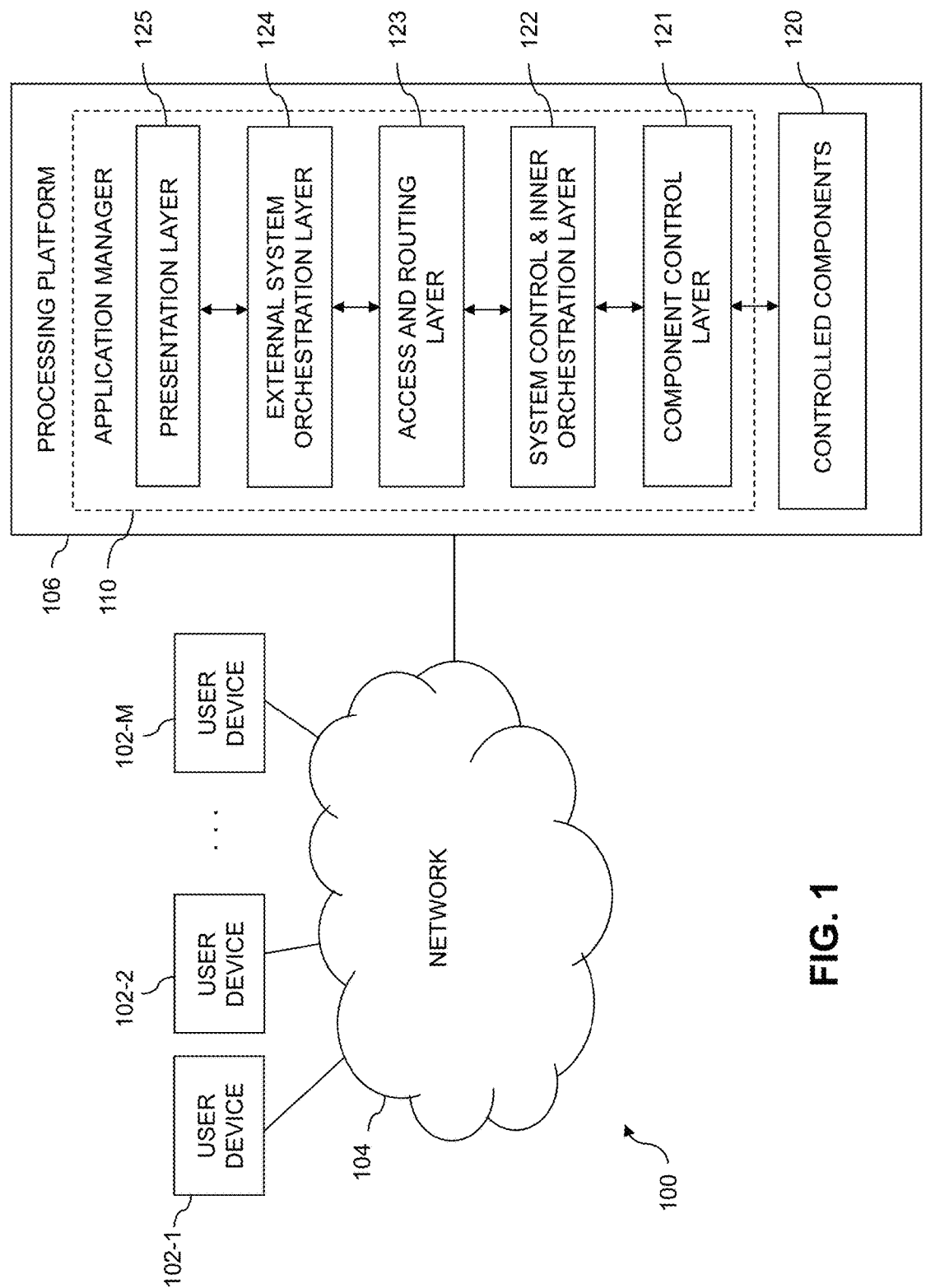
FIG. 1 is a block diagram of an information processing system comprising an application manager configured in accordance with a multi-layer application management architecture in an illustrative embodiment.

FIG. 1 shows an information processing system 100 configured in accordance with an illustrative embodiment of the present invention. The information processing system 100 comprises a plurality of user devices 102-1, 102-2, . . . 102-M coupled via a network 104 to a processing platform 106.

The user devices 102 in this embodiment can comprise, for example, desktop, laptop or tablet computers, mobile telephones, or other types of processing devices capable of communicating with the processing platform 106 over the network 104. Users associated with the respective user devices 102 are assumed to run respective sets of applications utilizing corresponding sets of virtual resources of at least one cloud-based system provided by the processing platform 106. For example, such users may be respective tenants of a cloud data center or other type of multi-tenant environment provided by the processing platform 106. These tenants are examples of what are more generally referred to herein as respective "users" of the processing platform 106. Tenants or other users may also be referred to as "customers" of a cloud service provider.

In some embodiments, the virtual resources comprise a plurality of containers allocable to respective applications under the control of the cloud-based system. Additional or alternative virtual resources that may be used in a given embodiment include virtual machines. For example, the virtual resources may comprise a plurality of virtual machines allocable to the applications under the control of the cloud-based system. Various combinations of containers, virtual machines and other virtual resources may be used in other embodiments. For example, virtual resources may comprise containers running in virtual machines.

The network 104 over which the user devices 102 and the processing platform 106 communicate illustratively comprises one or more networks including, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

The processing platform 106 is assumed to include a plurality of processing devices each having a processor coupled to a memory, and is configured to implement the virtual resources of the cloud-based system for use by applications.

By way of example, the processing platform 106 can be implemented at least in part utilizing converged infrastructure. Such converged infrastructure may comprise at least portions of VxRail™, VxRack™ or Vblock® converged infrastructure commercially available from VCE, the Virtual Computing Environment Company, an EMC Federation Company of the EMC Corporation of Hopkinton, Mass.

As indicated above, the processing platform 106 in the present embodiment is assumed to implement at least one cloud-based system. Such a cloud-based system is also referred to herein as simply a "cloud."

Examples of different types of clouds that may be utilized in illustrative embodiments include private, public and hybrid clouds. Private clouds illustratively include on-premises clouds and off-premises clouds, where "premises" refers generally to a particular site or other physical location of the business, enterprise, organization or other entity that utilizes the private cloud. Public clouds are assumed to be off-premises clouds. Hybrid clouds comprise combinations of public and private clouds and thus may include various combinations of on-premises and off-premises portions.

The processing platform 106 in the present embodiment is more particularly configured to implement virtual resources of one or more clouds for use by applications of at least one application management domain (AMD). The processing platform 106 further comprises an application manager 110 configured in accordance with a multi-layer application management architecture. The application manager 110 manages controlled components 120 that illustratively include respective ones of the virtual resources and applications. The multi-layer application management architecture of the application manager 110 in this embodiment includes at least a component control layer 121, a system control and inner orchestration layer 122, an access and routing layer 123, an external system orchestration layer 124, and a presentation layer 125, although it is to be appreciated that additional or alternative layers can be used in other embodiments.

The controlled components 120 comprising virtual resources and applications are under control of the component control layer 121. In addition, the applications are managed utilizing interactions between the layers of the multi-layer application management architecture of the application manager 110.

The virtual resources of the controlled components 120 illustratively comprise compute, storage and network resources associated with one or more host devices. Such host devices are examples of what are more generally referred to herein as "processing devices."

Figure 7:
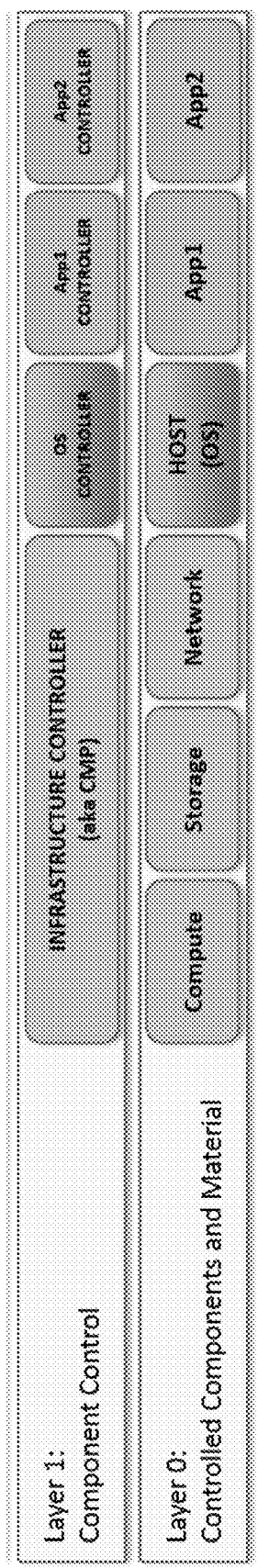
FIG. 7 shows two initial layers of a multi-layer application management architecture in an illustrative embodiment.
Figure 8:
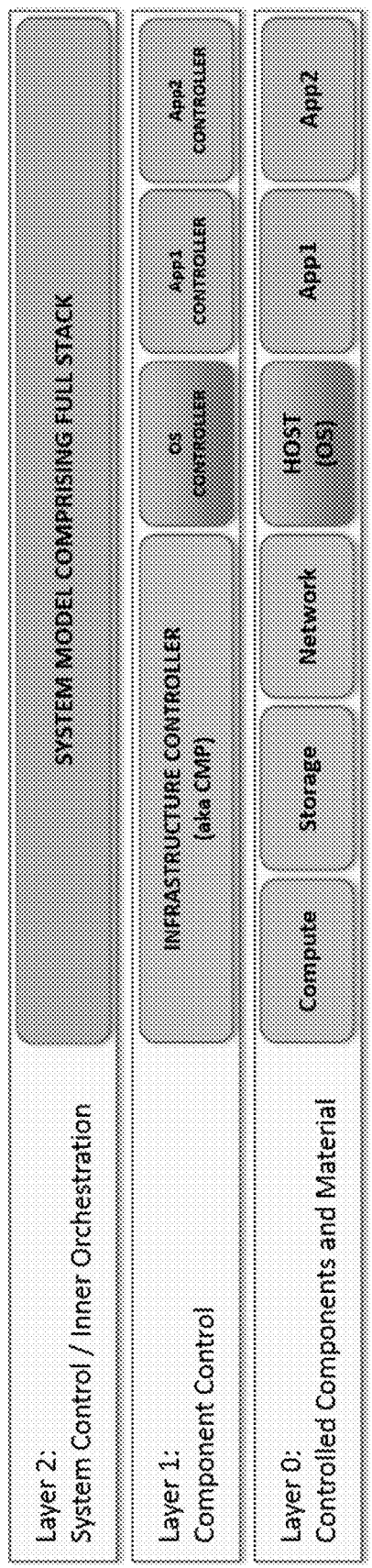
FIG. 8 illustrates the addition of a system control and inner orchestration layer over the two initial layers of FIG. 7.
Figure 9:
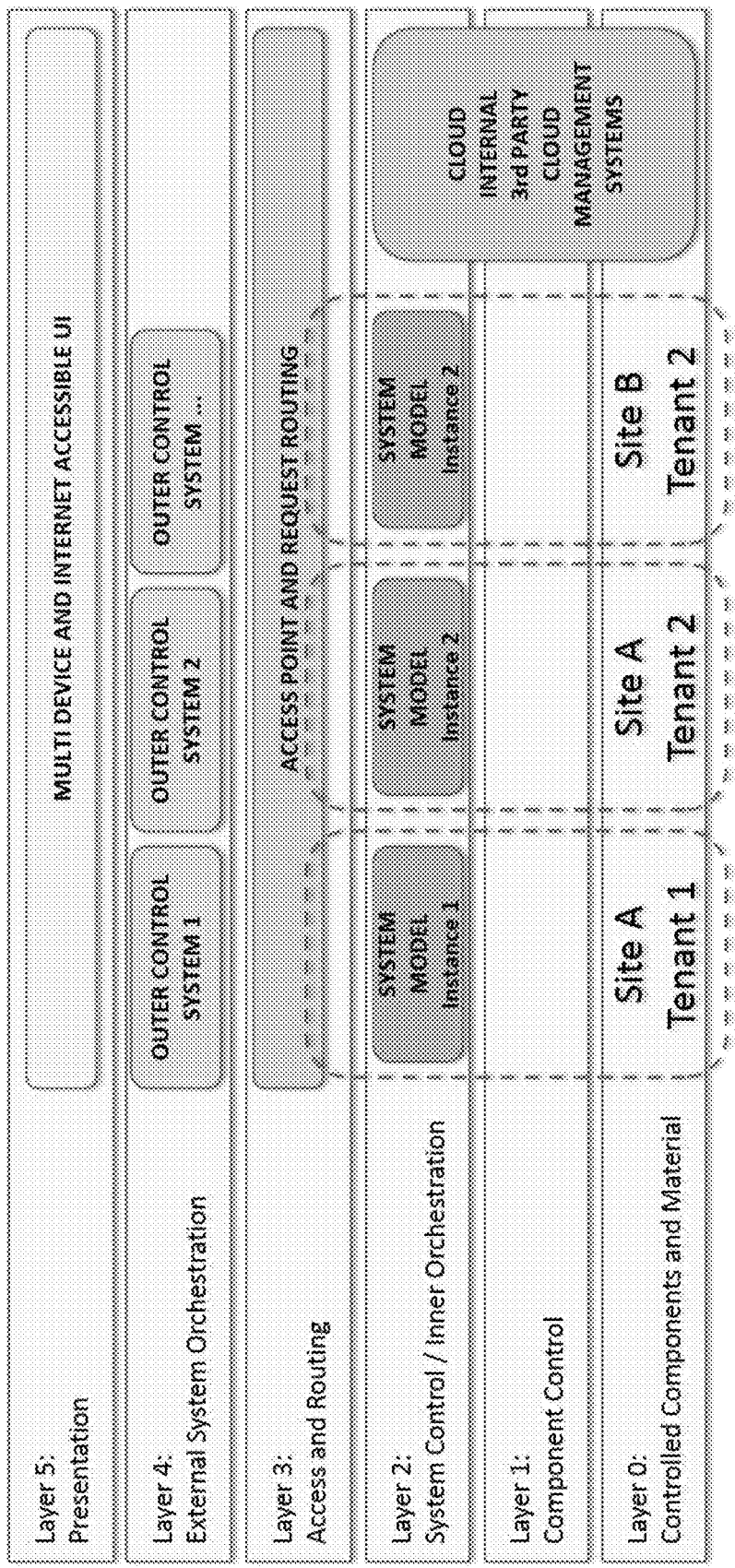
FIG. 9 shows a multi-layer application management architecture that includes as its initial three layers the three layers shown in FIG. 8.

An example of the controlled components 120 is shown in FIGS. 7-9 and denoted as Layer 0 associated with a multi-layer application management architecture comprising Layers 1 through 5 that overlay Layer 0.

Although it is assumed in this embodiment that controlled components 120 and hence Layer 0 are not part of the multi-layer application management architecture, in other embodiments controlled components 120 and their associated Layer 0 may be considered part of that architecture.

The component control layer 121 illustratively comprises at least one infrastructure controller configured to control the compute, storage and network resources, at least one operating system controller configured to control an operating system of at least one of the host devices, and a plurality of application controllers configured to control respective ones of the applications. An example of the component control layer 121 is Layer 1 of FIGS. 7-9.

The virtual resources may comprise different sets of compute, storage and network resources for different ones of a plurality of clouds and the component control layer 121 may comprise a separate infrastructure controller for each of the different clouds.

In addition, at least a subset of the infrastructure controllers, operating system controllers and application controllers of the component control layer 121 may each be configured to permit execution of actions on its associated controlled components via an application programming interface (API).

The system control and inner orchestration layer 122 illustratively comprises a plurality of system model instances implemented for respective ones of a plurality of tenants of at least one of the clouds. An example of the system control and inner orchestration layer 122 is Layer 2 of FIGS. 8 and 9.

The system control and inner orchestration layer 122 further comprises at least one inner orchestration engine configured to interact with a plurality of controllers of the component control layer 121 in order to provide services that utilize controlled components 120 of at least one system under control. An example of such an arrangement will be described below in conjunction with FIG. 11. The inner orchestration engine is configured to operate in accordance with a corresponding system model instance. The inner orchestration engine illustratively further comprises or is otherwise associated with a credentials provider configured to store credentials required to access controlled components 120 within a particular AMD of the inner orchestration engine. The system control and inner orchestration layer may comprise a plurality of inner orchestration engines each associated with a different one of a plurality of AMDs, as illustrated in the example of FIG. 12 to be described below.

The access and routing layer 123 illustratively comprises at least one API access point, a request scheduler and a request router. The access and routing layer 123 implements a set of functions for executing operations in the system control and inner orchestration layer 122 on behalf of different tenants associated with different AMDs each having a different inner orchestration engine within the system control and inner orchestration layer 122. An example of the access and routing layer 123 is Layer 3 of FIG. 9. An example arrangement of access point, request scheduler and request router components within such a layer is also illustrated in FIG. 12, and will be described in more detail below.

The external system orchestration layer 124 illustratively comprises at least one outer orchestration engine that executes operations in the system control and inner orchestration layer 122 across multiple tenants via at least one access point of the access and routing layer 123. An example of the external system orchestration layer 124 is Layer 4 of FIG. 9. Example arrangements of outer orchestration engines can be seen in FIGS. 13, 14 and 15, and will be described in more detail below.

Figure 15:
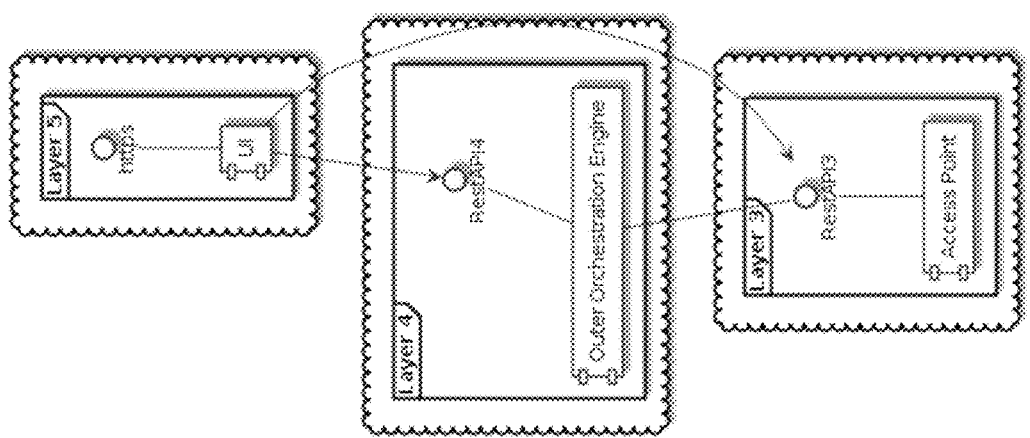
FIG. 15 illustrates a user interface in Layer 5 of the multi-layer application management architecture of FIG. 9 and its interaction with components in Layer 3 and Layer 4.

The presentation layer 125 illustratively provides one or more user interfaces that are accessible to one or more of the user devices 102 over the network 104. An example of the presentation layer 125 is Layer 5 of FIG. 9. An example arrangement of a user interface of such a layer is shown in FIG. 15.

It is to be appreciated that the particular processing platform configuration illustrated in the FIG. 1 embodiment is presented by way of example only, and that other embodiments can utilize other arrangements of additional or alternative components. For example, the particular layers 121 through 125 of the multi-layer architecture of the application manager 110 can be varied in other embodiments. Accordingly, additional or alternative layers can be used in other embodiments. Also, at least portions of the functionality of a particular one of the layers 121 through 125 can be alternatively implemented in one or more other ones of the layers 121 through 125.

As mentioned previously, the virtual resources implemented by the processing platform 106 illustratively comprise containers. Such containers are more particularly assumed to comprise respective Docker containers or other types of Linux containers (LXCs). In embodiments that utilize containers, the processing platform 106 illustratively comprises a plurality of container host devices each implementing one or more of the containers. Each of the container host devices illustratively comprises at least one processor coupled to a memory. Such container host devices are also considered examples of what are more generally referred to herein as "processing devices."

In some embodiments, Docker containers or other types of LXCs may be implemented on one or more Linux processing devices using Linux kernel control groups ("cgroups"). However, it is to be appreciated that embodiments of the present invention are not restricted to use with Docker containers or any other particular type of containers. Accordingly, numerous other techniques can be used in implementing containers in a given embodiment, and such techniques do not necessarily require use of the Linux cgroup feature. Clusters of containers can be managed across multiple container host devices of the processing platform 106 using container cluster managers such as Docker Swarm or Kubernetes. Such cluster managers may be implemented within or in association with the cloud-based system.

The processing platform 106 illustratively incorporates one or more container engines, such as one or more Docker engines. By way of example, a given Docker engine may be preconfigured to run on CoreOS, an open source lightweight operating system based on the Linux kernel and particularly configured to provide functionality for deploying applications in containers. Another example of a lightweight operating system suitable for use in implementing at least portions of the processing platform 106 in some embodiments is VMware® Photon OS™ which has a relatively small footprint and is designed to boot extremely quickly on VMware® platforms.

The processing platform 106 in some embodiments incorporates components for providing certain types of management and orchestration functionality. Such components may include VCE Vision™ Intelligent Operations Software, or other types of management and orchestration components, including components from Pivotal Cloud Foundry, or various combinations of multiple ones of these or other components.

In some embodiments, certain functionality of the cloud-based system is made available to a user by a cloud service provider on a Software-as-a-Service (SaaS) basis. Such users may be associated with respective ones of the user devices 102 and may correspond to respective tenants of the cloud service provider.

However, the term "user" in this context and elsewhere herein is intended to be more broadly construed so as to encompass, for example, human, hardware, software or firmware entities, as well as various combinations of such entities.

It should be understood that the particular arrangements of system and platform components as illustrated in FIG. 1 are presented by way of example only. In other embodiments, only subsets of these system and platform components, or additional or alternative sets of components, may be used, and such components may exhibit alternative functionality and configurations.

Examples of processing platforms that may be used to implement at least portions of the processing platform 106 of the FIG. 1 embodiment will be described in more detail below in conjunction with FIGS. 16 and 17. A given such processing platform comprises at least one processing device comprising a processor coupled to a memory, and the processing device may be implemented at least in part utilizing one or more virtual machines or other virtualization infrastructure.

Additional details regarding illustrative embodiments will now be provided with reference to FIGS. 2 through 15. The embodiments to be described include examples of a multi-layer architecture and associated functionality for an application manager such as application manager 110 of the FIG. 1 embodiment. However, the multi-layer architecture as described more generally provides a reference architecture for implementation of an application management solution (AMS) in a wide variety of different types of cloud-based systems. The reference architecture illustratively comprises Layers 1 through 5 illustrated in FIGS. 7-9. As mentioned previously, the component control layer 121, also denoted Layer 0, is not considered part of the reference architecture in the illustrative embodiments, but could be considered part of that architecture in other embodiments.

The application automation functionality in these embodiments illustratively involves a number of distinct actors. For example, an AMS can enable different organizational units (e.g., intra-company units or multiple company units) to collaborate seamlessly when providing information technology (IT) solutions to end users. In addition to the previously-noted tenants, other actors in a given embodiment may include a cloud service provider (CSP) responsible for cloud infrastructure, and a managed service provider (MSP) that provides application management services in accordance with service level agreements (SLAs) or other types of agreements of service contracts, such as OLAs for tenant internal MSP units. Note that an IT service company may have different organizational units for different services, for example, a unit for customer and/or system onboarding and another for steady-state support of applications.

Different units may have similar roles, as in the case of an "administrator" with different scope depending on the service contracts. If necessary, the actors can be disambiguated by specifying the organizational unit after the role in brackets, for example, as follows:

Administrator (CSP)
Administrator (MSP)
Administrator (Tenant)
IT Business Manager (CSP)
IT Business Manager (MSP)
IT Business Manager (Tenant)

TABLE 1 in the Appendix illustrates examples of roles that various actors can play in illustrative embodiments. It is to be appreciated that the particular entries in this table and the other tables of the Appendix are illustrative examples only, and should not be construed as limiting in any way.

TABLES 2 and 3 in the Appendix illustrate various example core and additional features that may be provided in a given AMS.

With regard to the systems under control, the AMS may be agnostic. For that reason it may be underpinned by a data and operation model that is not bound to any particular software product family.

In some embodiments, application automation is modeled as changes in parameters and states of software components. All parameters and states form a space in which the application automation and its associated orchestration operates. This space is typically not hard-coded in the AMS, but instead is in the form of a framework for arbitrary parameter and state spaces of Systems under Control (SuCs). The concept is not limited to SuCs but rather applies to SuCs and all controllable components of such SuCs, both also referred to herein as "controllable targets." A particular parameter set and state of a controllable target is referred to as the "configuration" of a controllable target. For example, at a given point of time a database installation is configured with a set of parameters (e.g., data buffer size or enabled logging) and it is in one of the states of the underlying state model.

Figure 2:
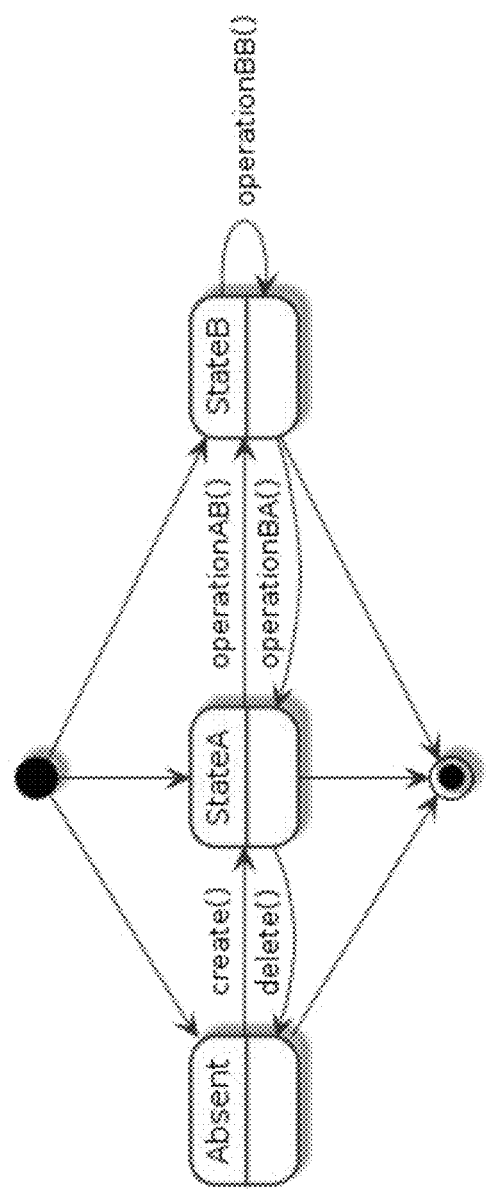
FIG. 2 illustrates example states and operations for a controllable target.

FIG. 2 illustrates an example of a state model for controllable targets. One particular state is available for all targets: Absent. This state indicates that the target does not exist. In the example, when the target is created, it is in state A. Applying the various available state-changing operations on that target will bring the target from one state to the other. In this example, deletion of the target is possible from state A but not from state B. The model includes parameter-changing operations which do not alter the state but rather an internal parameter or attribute of the target, such as operationBB.

Figure 3:
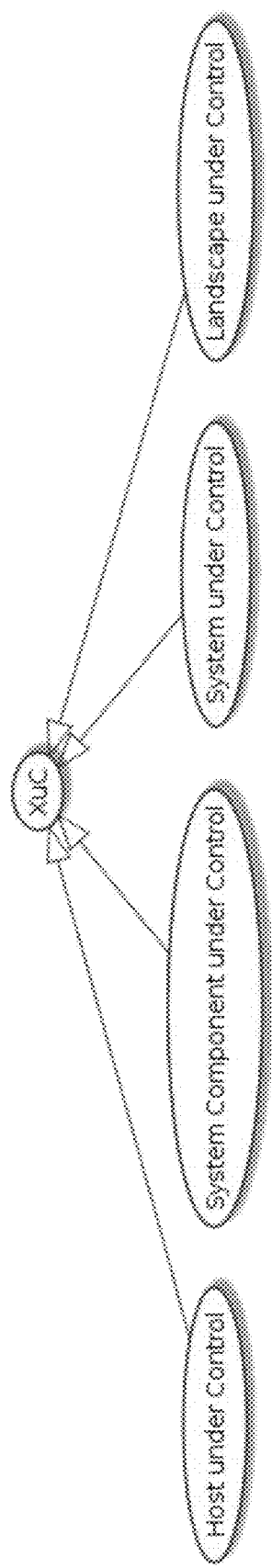
FIG. 3 shows examples of different types of things under control.

FIG. 3 illustrates examples of different types of controllable targets. Controllable targets are not limited to SuCs. More generally, controllable targets can comprise a host, a system component, or a group of systems. The latter is also referred to herein as a "landscape." These and other example controllable targets are also referred to herein as "Things under Control" (XuCs). XuCs are controlled by software components that are referred to herein as "controllers." Such controllers communicate with the XuC via an endpoint that the XuC exposes (e.g., ssh on a UNIX host).

Figure 4:
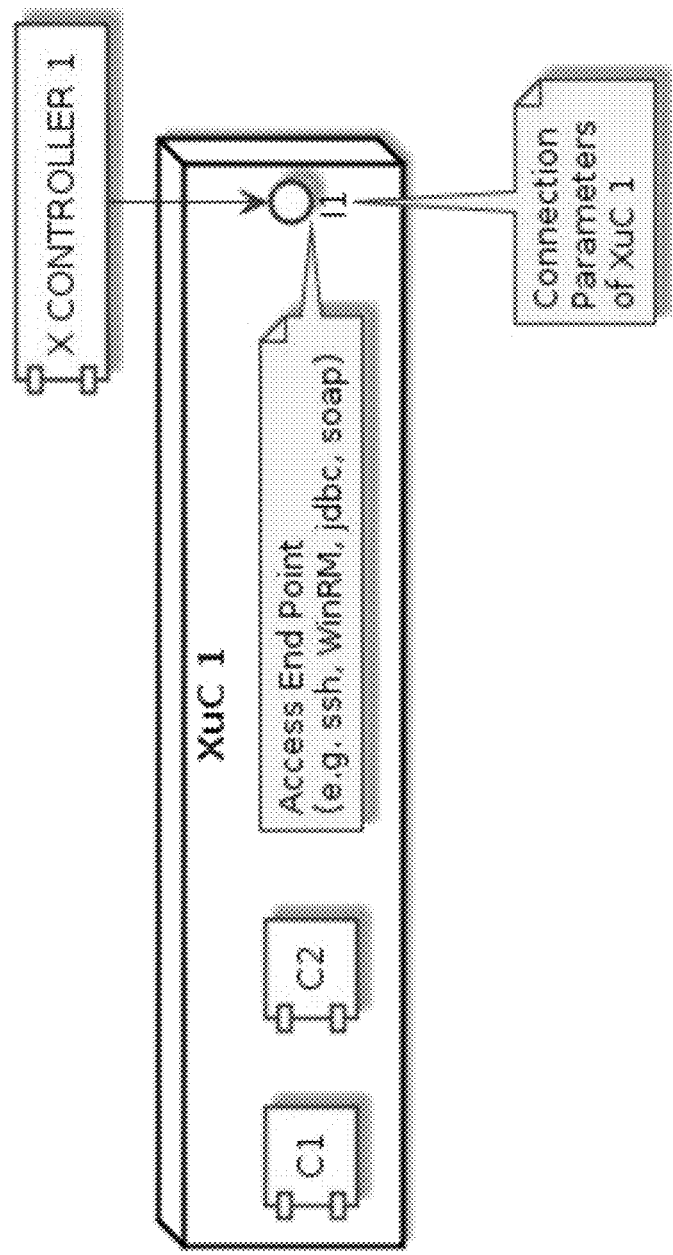
FIG. 4 shows an example of a component controller and a controlled component.

FIG. 4 shows an example of a component controller and a controlled component. The controlled component is denoted XuC 1. In this example, XuC 1 contains elements C1 and C2 that are subject to control. These are not directly accessible, they can only be read and changed via access to the XuC. Such elements are also referred to herein as "controllables."

TABLE 4 in the Appendix shows additional examples of controllable targets.

Operations that query or change the configuration of a target are referred to herein as "atomic operations" (or just "operations") when executed via a controller request. It does not matter how complex the underlying technical process is for one operation (e.g., SAP instance start on a host). The operation is atomic from the point of view of the controller. The execution of the task is either successful or not.

The set of all available atomic operations provided by all controllers that are installed in a particular AMS is referred to as the "inventory of atomic operations." Such operations can be categorized, for example, along stack dimensions (e.g., infrastructure, OS, application) and/or along application management disciplines of monitoring, deployment, configuration and export/import.

The semantics of atomic operations are usually bound to the semantics of the respective controllable targets. There are typical patterns or types of operations that occur repeatedly (e.g., create, copy, delete, start, stop) and instances of such patterns or types of operations often exhibit very similar semantics.

TABLE 5 in the Appendix shows examples of atomic operations for these and numerous other types.

The set of all XuCs that are under control of a given AMS component is referred to as the AMD of that component.

As XuCs can be recursively nested, the resulting systems can be arbitrarily complex.

Figure 5:
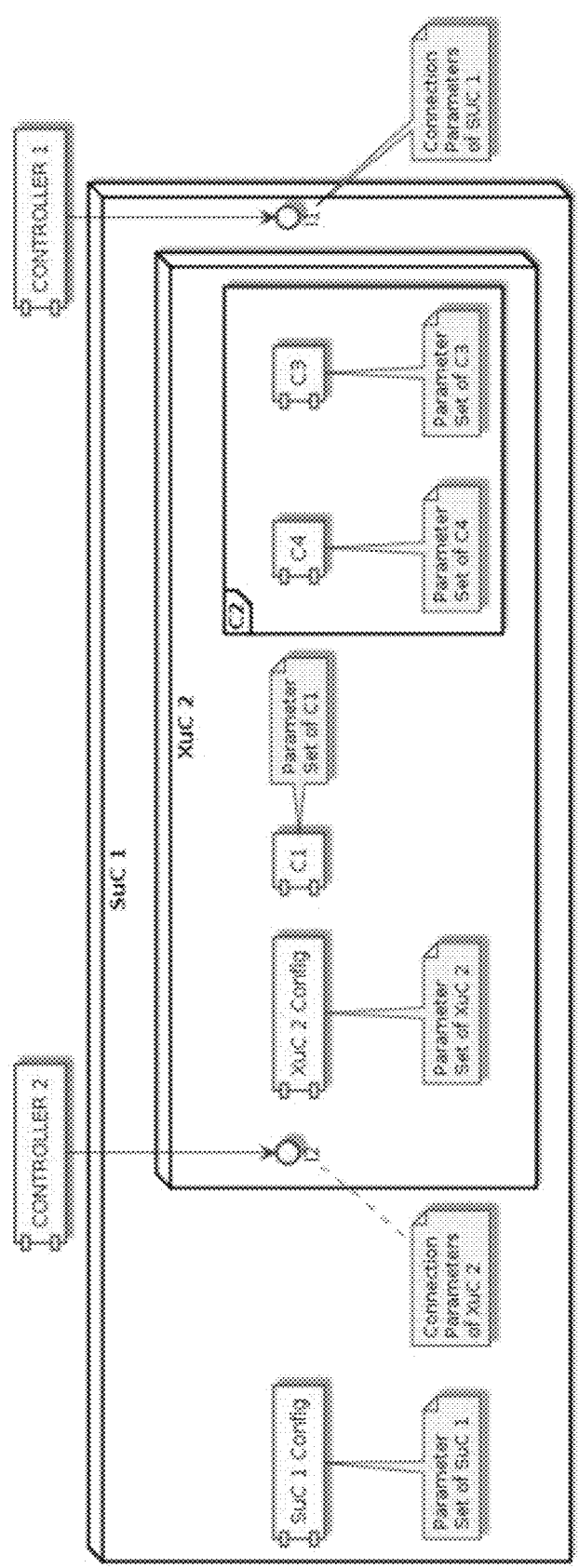
FIG. 5 illustrates controllable targets and configurations in a complex system under control.

FIG. 5 illustrates controllable targets and configurations in a complex system under control or SuC. In this example, an SuC denoted SuC 1 has a child XuC denoted XuC 2. SuC 1 is controlled by a first controller denoted Controller 1 and the embedded XuC is controlled by another controller denoted Controller 2. SuC 1 contains XuC 2. In this example, SuC 1 does not have any other controllables, but XuC 2 has controllables C1, C2, C3 and C4. The controllables C3 and C4 are contained in C2. All targets have parameter sets. In addition, XuC 2 includes connection parameter sets that comprise all required information so that the controllers are able to connect to them.

The set of configurations of an XuC and all contained controllable targets (recursively) combined with the description of the topology of the XuC are referred to herein as the "blueprint" of the XuC. As noted above, configuration of a target subsumes parameter settings as well as the state of the target. The actual or current blueprint of an XuC is referred to as the "factual blueprint" of the XuC. Similarly, the set of blueprints of all XuCs of an AMD is referred to as the "factual blueprint" of the AMD.

The to-be blueprint for an XuC deployment is referred to as the "deployment blueprint." If the factual blueprint of an XuC is used to register an already existing XuC into the AMS then it is referred to as a "registration blueprint." Deployment and registration blueprints are subsumed under "execution blueprints."

Figure 6A:
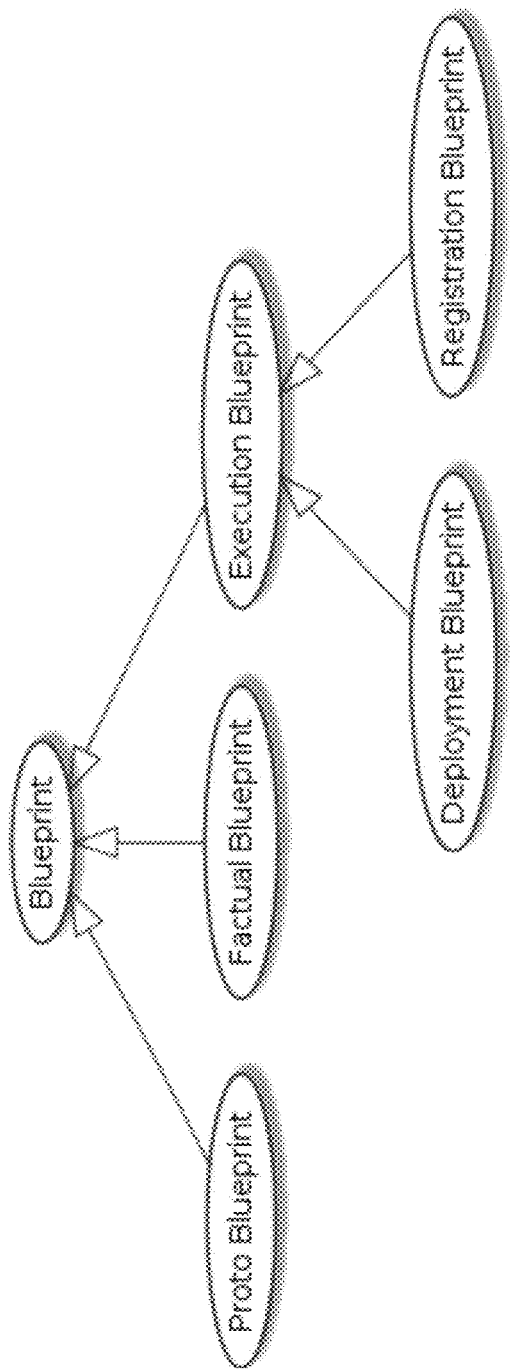
FIG. 6A shows examples of different types of blueprints.
Figure 6B:
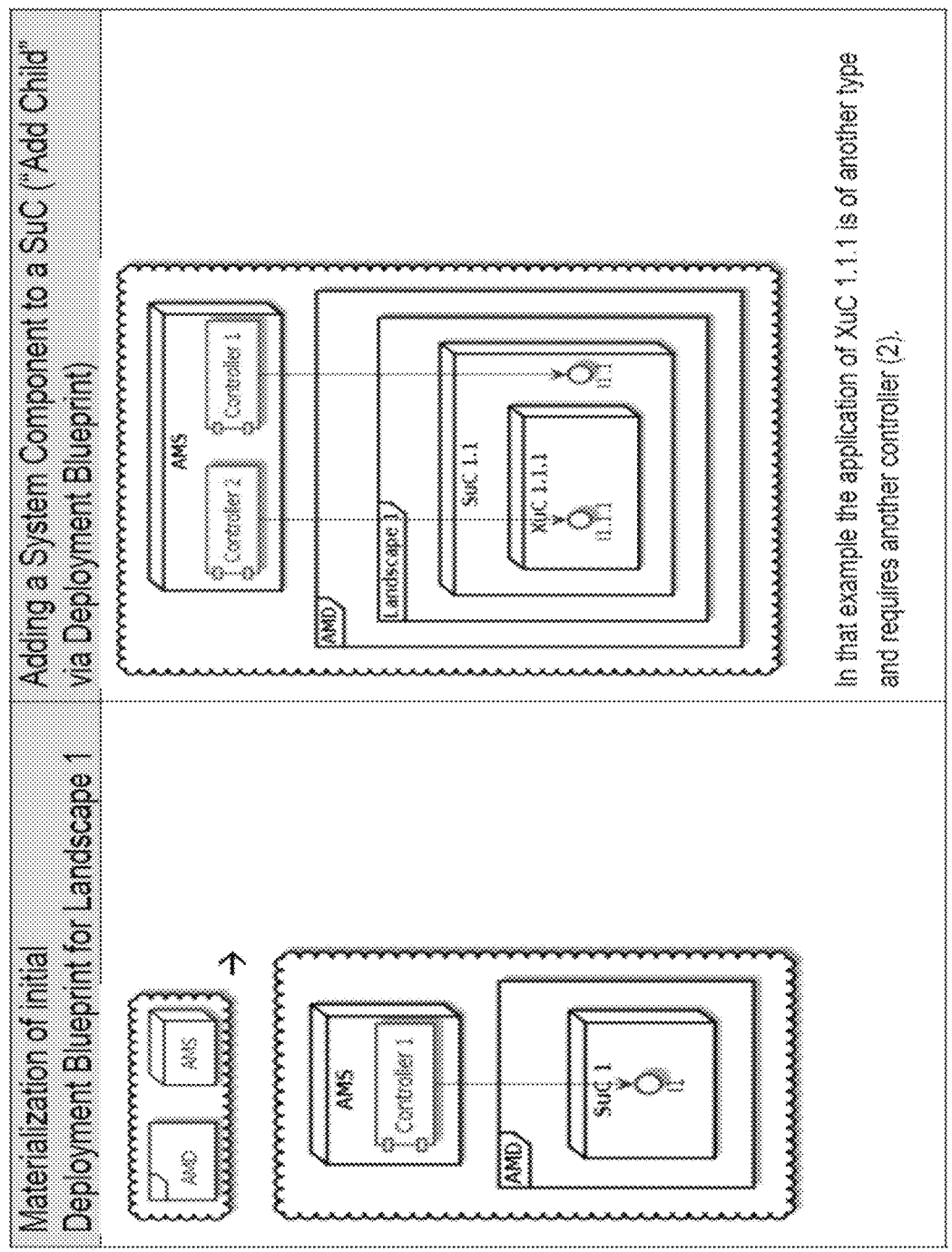
FIG. 6B illustrates an addition of a system component to a system under control using a deployment blueprint.

Execution blueprints specify all parameters and states required for the execution of the corresponding deployment and/or registration. They may be derived from under-parameterized or otherwise under-specified blueprints that act as templates for the construction of execution blueprints. These under-specified blueprints are called "proto blueprints." FIG. 6A illustrates the relationships between the various types of blueprints described above.

Blueprints complement the use cases in which atomic operations are explicitly executed with use cases that follow a more declarative approach. Upon execution, the AMS converges the XuCs into a configuration that corresponds to the desired state expressed in an execution blueprint provided by the AMS user. In other words, the factual blueprint of an XuC equals the execution blueprint after successful execution.

Deployment blueprints can be used to build up a system or system landscape. For example, with reference to FIG. 6B, the addition of a system component to an SuC using a deployment blueprint is shown. The left side of the figure illustrates the materialization of an initial deployment blueprint for a landscape denoted as Landscape 1. The right side of the figure illustrates the addition of a system component to the SuC using an "add child" operation via a deployment blueprint. In this example, the application of XuC 1.1.1 is of another type and requires the addition of another controller denoted Controller 2.

Figure 6C:
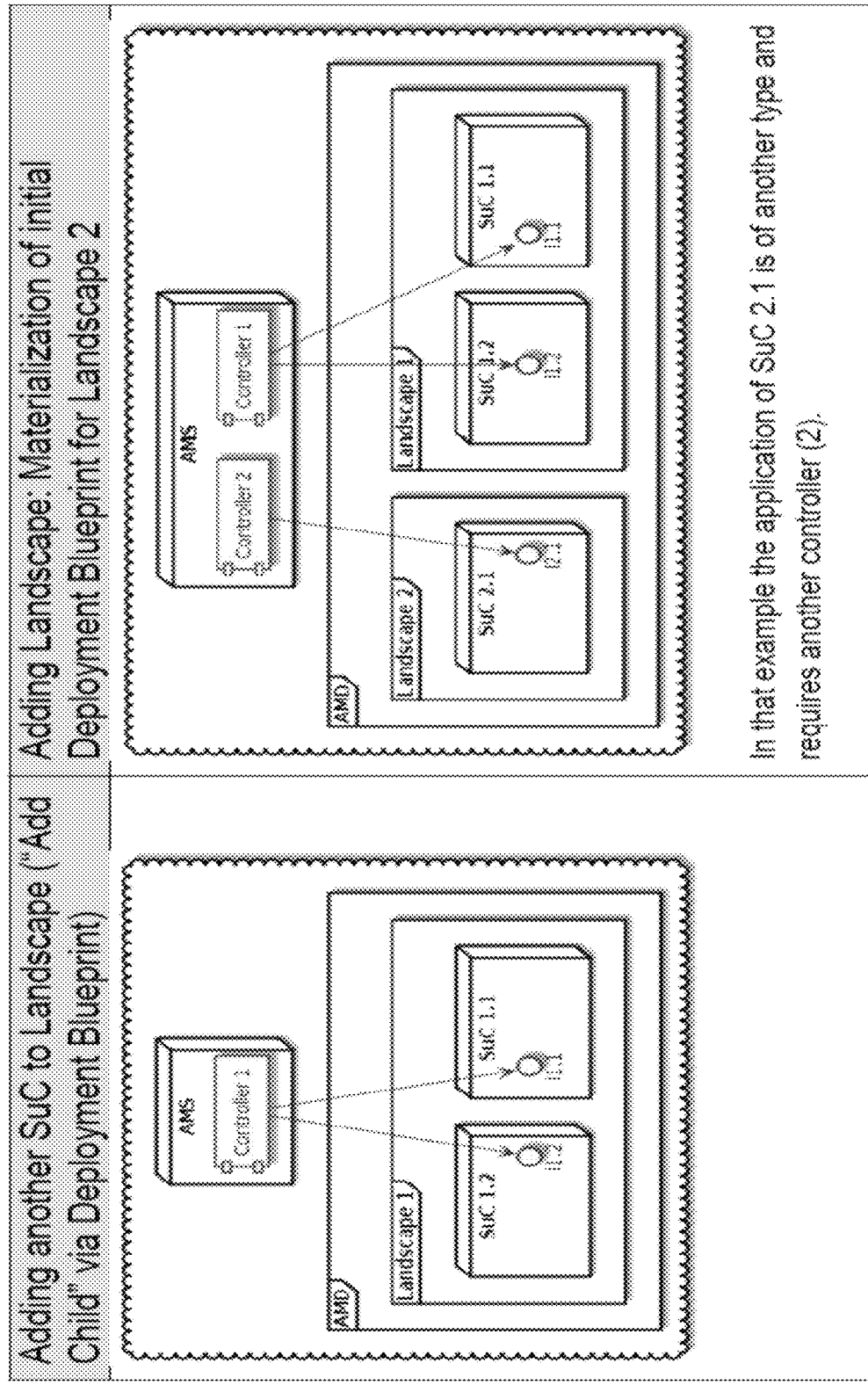
FIG. 6C illustrates addition of a new landscape to an existing landscape via deployment blueprints.

FIG. 6C shows another example, illustrating addition of a new landscape to an existing landscape using a deployment blueprint. The left side of the figure illustrates the addition of another SuC to Landscape 1. The right side of the figure illustrates the addition of another landscape denoted Landscape 2. In this example, the application of SuC 2.1 is of another type and requires the addition of another controller denoted Controller 2.

The multi-layer architecture mentioned previously will now be described in greater detail with reference to FIGS. 7-9. It is assumed that this multi-layer architecture includes five layers denoted Layer 1 through Layer 5. These layers correspond to respective ones of the layers 121, 122, 123, 124 and 125 of the multi-layer architecture of application manager 110 in the FIG. 1 embodiment. There is an additional underlying layer denoted Layer 0 that includes controlled components and material. Such a layer corresponds to the controlled components 120 in the FIG. 1 embodiment. As mentioned previously, in other embodiments, a layer such as Layer 0 can be considered part of the multi-layer architecture.

The multi-layer architecture in illustrative embodiments serves as a reference architecture for an AMS. It is assumed that each of the layers is implemented using redundant servers or other types of redundancy in order to ensure high availability. For example, all controllers of Layer 1 may be implemented on redundant servers for high availability. The other layers may be similarly configured to support high availability.

Referring initially to FIG. 7, Layer 0 and Layer 1 are shown.

Layer 0 comprises the controlled components that belong to the managed applications and underlying infrastructure as well as all required material for provisioning of applications. This material may include, for example, software installation media and VM templates.

Layer 1 is the component control layer and comprises infrastructure, OS and application component controllers. For example, different clouds may require different controllers, such as different cloud management platforms (CMPs). Also, different operating systems may require specialized OS controllers and different application components may require specialized application controllers. All controllers in this embodiment are assumed to allow the execution of actions on the controlled component via REST API, ideally using standardized APIs. This layer provides the first extension point of the AMS by allowing software providers to build controllers that can be plugged into the AMS.

Additionally, Layer 1 is configured to allow the execution of actions on or to query data from existing system components. It is not intended to deploy and/or remove systems or system components or to cater to the complex inherent logic of application systems. The components therein instead adhere to a "fire and forget" strategy. Note that the OS controller is an extension point where server management solutions such as Chef, Salt or Puppet may be hooked in.

FIG. 8 illustrates inclusion of Layer 2 above Layer 0 and Layer 1 of FIG. 7. FIG. 9 shows the full set of layers including Layer 0 through Layer 5.

Layer 2 is the system control and inner orchestration layer. It is configured to provide services with which operations can be performed on application system level. These services consider the complex nature of a given SuC by properly modeling its state and parameters as well as the states, parameters and dependencies of the components that belong to the SuC. It is also responsible for the provisioning and disposal of systems or system components. If required for core functions such as deploy, launch or shutdown, this layer will orchestrate multiple operations within one Layer 1 controller or across multiple Layer 1 controllers. This type of orchestration, referred to herein as "inner orchestration," is usually not explicitly modelled by an automation engineer but instead implicitly encoded in the system model.

The AMS component that provides the services for Layer 2 is referred to herein as an "inner orchestration engine." The set of all XuCs controlled by that engine is its AMD.

Layer 2 is also the layer in which autonomous application management is implemented. For example, it can provide secure storage of any XuC credentials required to execute operations on the controlled components. The need for securely storing and providing XuC credentials arises in many automation contexts. For example, credentials are typically required in the context of a Puppet manifest.

Layer 2 provides a second extension point in at least two ways. First, the AMS can provide a mechanism to load or install system models supplied by software providers into the corresponding component of the AMS. Second, automation engineers as well as other suppliers can construct and deliver ready-made proto blueprints for software solutions compatible with available system models.

Layer 3 is the access and routing layer. It provides a highly available API access point to the AMS. The API implements a generic, application-agnostic set of functions to execute and schedule operations on Layer 2. It routes requests to the appropriate Layer 2 component of the AMS or to 3rd party cloud management systems that are integrated into the AMS. This support for integration with 3rd party systems can be viewed as providing a third distinct extension point of the AMS.

In addition, Layer 3 implements the multi-tenancy and multi-site requirements of the AMS, including any hybridity requirements. It is also responsible for authentication, authorization and logging of operations. It is assumed that this layer is under governance of the CSP that hosts the AMS.

Layer 4 is the external system orchestration layer. It comprises all components that execute Layer 2 operations through the Layer 3 API in order to perform system management functions. These can be external monitor systems or systems that perform orchestration of multiple operations explicitly modeled by an automation engineer or provided as an additional package by a software provider or other company. Additionally or alternatively, it can include a credentials manager that controls the credentials management component inside Layer 2.

The control systems on Layer 4 are also referred to herein as "outer control systems" as they are outside the API boundaries of Layer 3 and hence need to authenticate against the API. These control systems can include, for example, workflow systems (e.g., BPMN compatible) or scripting extensions (e.g., plugin into Eclipse for Groovy scripts) that allow automation engineers and others to design, test and run scripts that encode the logic of orchestrated operations. As these systems live outside the tenant and site boundaries they can orchestrate operations on systems across tenants. For example, an MSP administrator may want to apply patches to all SAP systems of all tenants for whom the MSP provides SAP system management services. Or a particular orchestration for one tenant may have to span multiple sites for a hybrid application management scenario.

Layer 4 provides a fourth extension point of the AMS as suppliers can construct and provide automation packages that are compatible with one of the outer control systems of the AMS. Additionally or alternatively, software providers may develop and distribute additional outer control systems that interface with the Layer 3 API.

Layer 5 is the presentation layer of the AMS. It provides a user interface that is directly and easily accessible via the Internet and which works equally well on PC, tablet and even smart phone, depending on the exposed function. For example, some of the actors may need to access the AMS while traveling or during customer meetings, especially users with account manager or IT business roles. This layer constitutes the fifth and final extension point of the AMS as it allows software providers to develop an alternative user interface that interfaces with the outer control systems and the Layer 3 API.

TABLE 6 in the Appendix shows layers contributing to example core features of an AMS. In this table, B denotes back end, and UI denotes user interface.

TABLE 7 in the Appendix shows examples of product quality enhancements provided in some embodiments.

Additional characteristics and other functional features of Layer 1 through Layer 5 in illustrative embodiments will now be described with reference to FIGS. 10 through 15. It is to be appreciated that the particular listings of features provided below and elsewhere herein are not requirements, but are instead possible features of illustrative embodiments. A given embodiment can include only subsets of the listed features, and may include additional or alternative features not explicitly listed.

In the following description, listed features are numbered using the format x.y, where x denotes the layer number, and y denotes the feature number.

Figure 10:
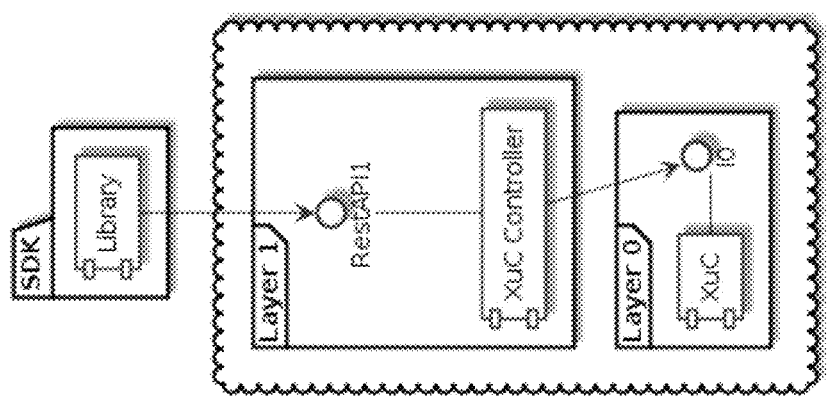
FIG. 10 illustrates a controller configured for component control in Layer 1 of the multi-layer application management architecture of FIG. 9.

FIG. 10 illustrates one possible embodiment of a controller of Layer 1, the component control layer.

The following are examples of functional features of a Layer 1 controller:

1.1: The controller provides a REST API that allows execution of atomic operations against XuCs. The number and scope of these operations will depend on the particular implementation of the controller.

1.1b: The controller API to execute operations follows a standard to be established by the implementer of the AMS framework.

1.2: The controller provides SDKs (e.g., libraries) for Java and C# for easy integration with Layer 2 engines.

1.3: The controller is stateless.

1.4: The controller can perform the operations on the XuC without the need of having AMS-specific agent software installed on the XuC. Note that agents that belong to the XuC itself do not count as AMS-specific agents. The SAP Control Host Agent that belongs to the SAP NetWeaver stack is such an example.

1.5: The controller does not store credentials for the XuC interface (10).

1.6: The controller can write information into a central logging system for the purpose of root cause analysis of AMS malfunctions.

Figure 11:
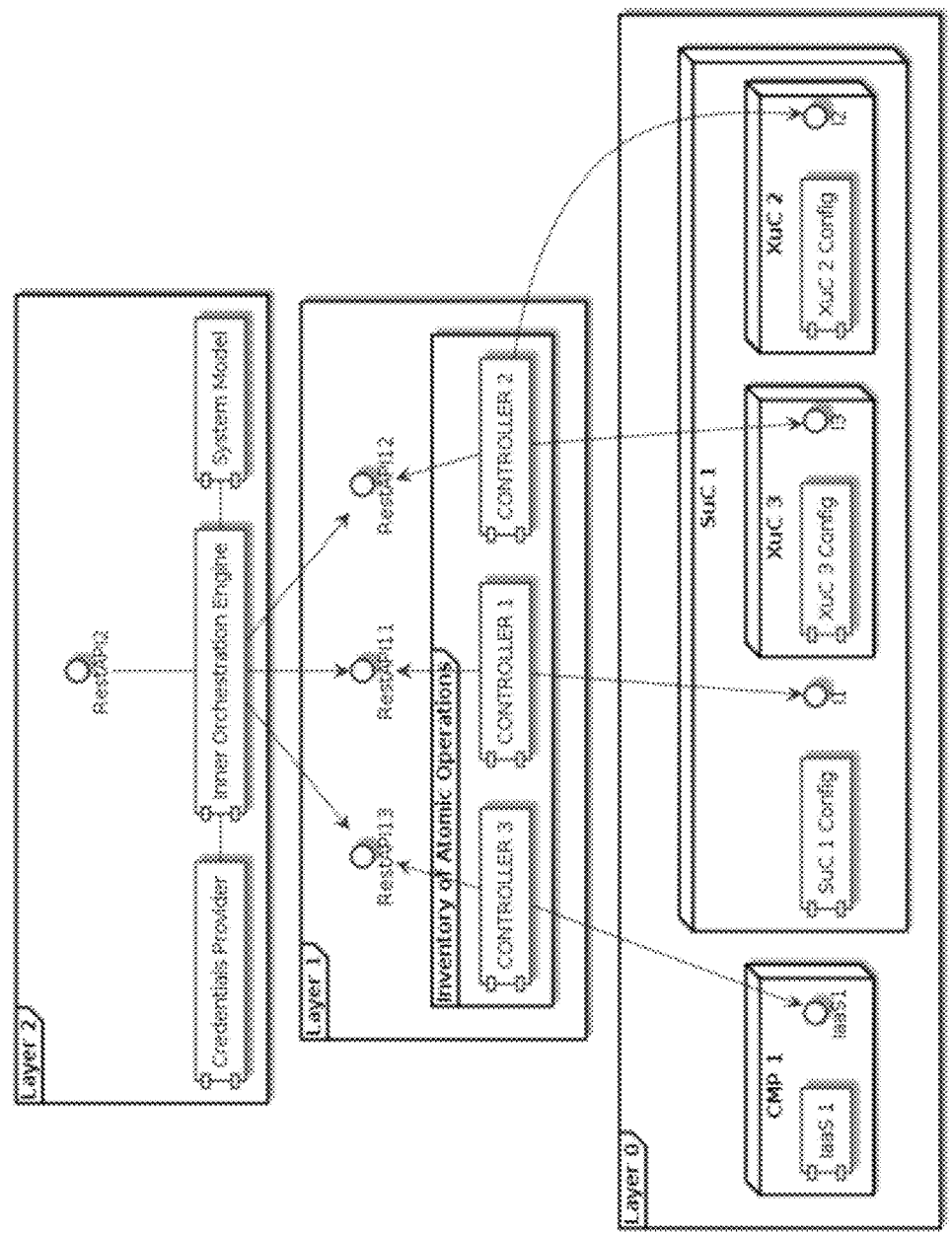
FIG. 11 illustrates an inner orchestration engine in Layer 2 of the multi-layer application management architecture of FIG. 9 and its interaction with components in Layer 1 and Layer 0.
Figure 12:
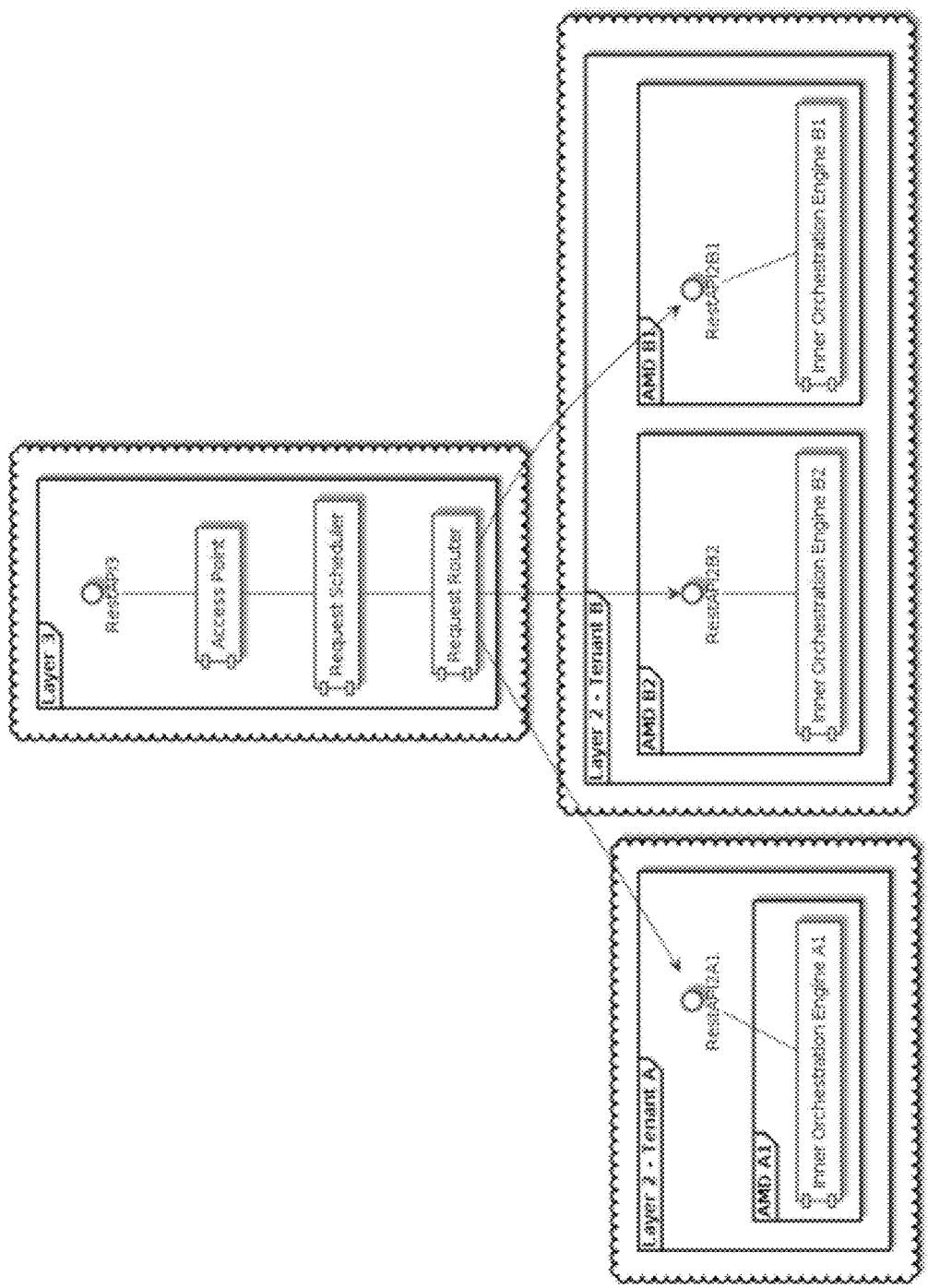
FIG. 12 illustrates an access point, request scheduler and request router in Layer 3 of the multi-layer application management architecture of FIG. 9 and its interaction with components in Layer 2.

FIG. 11 illustrates one possible embodiment of an inner orchestration engine of Layer 2, the system control and inner orchestration layer.

A given inner orchestration engine of Layer 2 comprises multiple AMS components that enable a user to manage a potentially complex SuC, such as SuC 1 of FIG. 11. It can integrate all services of all related controllers that expose atomic operations relevant for the management of the SuC, referred to herein as the "inventory of atomic operations." These can be operations directly related to the system (interface I1) or related to system components (interfaces I2, I3) or services outside the system, for example IaaS services used to control infrastructure for deployment and disposal of the system or system components.

The inner orchestration engine is illustratively associated with a particular tenant and it is assumed that it has TCP/IP network access to all Layer 1 controllers and that the Layer 1 controllers have TCP/IP network access to all components in Layer 0.

All XuCs that are under control of an instance of the inner orchestration engine are said to be in the AMD of that instance. The AMD may span multiple sites depending on the network topology of the tenant.

The inner orchestration engine is application agnostic. The orchestration logic is encoded in one or more separate system models that the AMS provider or other parties may implement. Note that such system models are not limited to application systems. They could also include entire software solutions or landscapes integrating multiple potentially complex systems. Furthermore, the inner orchestration engine can leverage a credentials provider that securely stores the credentials required to execute operations on the XuC interfaces.

The following are examples of functional features of a given inner orchestration engine of Layer 2:

2.1: The inner orchestration engine exposes the atomic operations of all controllers that are relevant for the management of the SuC.

2.2: The inner orchestration engine reflects the topology and configuration (e.g., states and/or parameters) of the SuC and the respective configurations of its components.

2.3: The inner orchestration engine caters to the system-inherent dependencies of components when it provides system operations as services via its API. Examples include launch and shutdown operations that should respectively start and stop the system components in the correct order.

2.4: The inner orchestration engine provides services for the deployment of systems and system components via deployment blueprints following standards such as TOSCA and/or OASIS CAMP.

2.5: The inner orchestration engine provides services for the disposal of systems and system components.

2.6: The inner orchestration engine provides services for the registration of existing systems (not deployed by the inner orchestration engine) that are controllable and/or compatible with an installed system model.

2.7: The inner orchestration engine provides services for querying the availability, performance and health of the SuCs and system components.

2.7b: The inner orchestration engine can configure performance and health monitoring components (e.g., thresholds for critical states and/or alerts).

2.8: The inner orchestration engine provides autonomous execution of operations based on configurable rules and/or policies.

2.9: The inner orchestration engine can automatically discover relevant controllables inside the SuC.

2.10: The inner orchestration engine provides interfaces to credentials providers that securely store and present the credentials required for the execution of operations on Layer 0 components.

2.11: The inner orchestration engine provides non-disruptive upgrade of the inner orchestration engine components including the installed system models.

2.12: The inner orchestration engine is configured for high availability.

2.13: The inner orchestration engine can write information into a central logging system for the purpose of root cause analysis of AMS malfunctions.

FIG. 12 illustrates one possible embodiment of an access point, request scheduler and request router of Layer 3, the access and routing layer.

Whereas components on Layers 0 to 2 belong to one tenant and may be distributed over multiple AMDs, the AMS components on Layer 3 provide one central access point to the AMS that allows execution of system management operations on all AMDs that are part of the AMS installation. This layer allows operations to be executed immediately or scheduled. It makes sure that the request is routed into the appropriate AMD.

The following are examples of functional features of components of Layer 3:

3.1: The access point provides a highly available and scalable REST API through which the user can execute or schedule system management operations against the Layer 2 inner orchestration engine of a connected AMD.

3.1b: The API allows for one time as well as recurrent executions of system management operations.

3.1c: The API logs all executions of system management operations with time and requesting user.

3.2: The access point authenticates the requesting user against an identity management system such as Active Directory or LDAP to which the access point is connected.

3.3: The access point tests whether the authenticated user is authorized to execute and/or schedule the request and declines the request if the authorization is insufficient.

3.4: The request router ensures that requests are routed to the correct Layer 2 inner orchestration engine depending on the targeted AMD specified in the request.

3.5: The AMS securely transports requests into the target AMD even if there is no network connectivity between Layer 3 and Layer 2.

3.6: The access point and/or request router support different Layer 2 inner orchestration engines by implementing a flexible plug-in architecture that specifies how operations can be executed and which authorizations need to be tested for which type of operations.

3.7: The access point and/or request router support the integration with 3rd party system management tools (e.g., in Layer 2, 1, 0) so that it can proxy requests to those tools.

3.8: The AMS contains a Java and/or C# SDK/library for integrating the access point services into Java and/or C# programs.

3.9: The access point and request router write information into a central logging system for the purpose of root cause analysis of AMS malfunctions.

Figure 13:
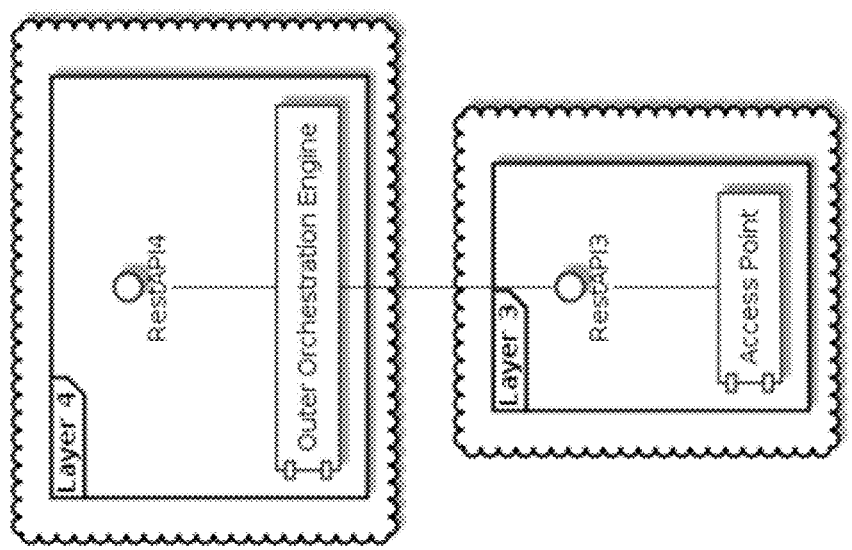
FIG. 13 illustrates an outer orchestration engine in Layer 4 of the multi-layer application management architecture of FIG. 9 and its interaction with an access point in Layer 3.

FIG. 13 illustrates one possible embodiment of an outer orchestration engine of Layer 4, the external system orchestration layer.

Layer 4 provides additional orchestration capabilities that allow the explicit orchestration of multiple Layer 2 operations via one or multiple orchestration engines. As these components are outside the main Layer 3 access point of the AMS, they are referred to as "outer orchestration engines." Being external allows them to orchestrate operations across multiple tenants and AMDs and to integrate additional AMS-external systems. This provides a high degree of flexibility to MSPs which need to manage systems of many tenants and it constitutes an additional extension point as different 3rd party workflow systems can be leveraged to operate on Layer 4. For example, BPMN workflow engines are designed to model the collaboration between human and system actors.

Layer 4 components do not necessarily have to be workflow engines. The more general term "L4 scripts" is used to denote artifacts that encode the execution logic of the orchestrations. Other more general terms that can be used to describe such components include "recipes," "workflows" or "scripts."

The following are examples of functional features of a given outer orchestration engine of Layer 4:

4.1: The outer orchestration engine can orchestrate Layer 2 system operations by running those operations in sequence, in parallel, with conditions ("gateways"), loops and similar workflow-like control logic ("L4 scripts").

4.2: The outer orchestration engine provides a REST API that allows the execution or scheduling of L4 scripts.

4.3: The outer orchestration engine can propagate the user's credentials to Layer 3.

4.4: The outer orchestration engine can write information into a central logging system for the purpose of root cause analysis of AMS malfunctions.

Figure 14:
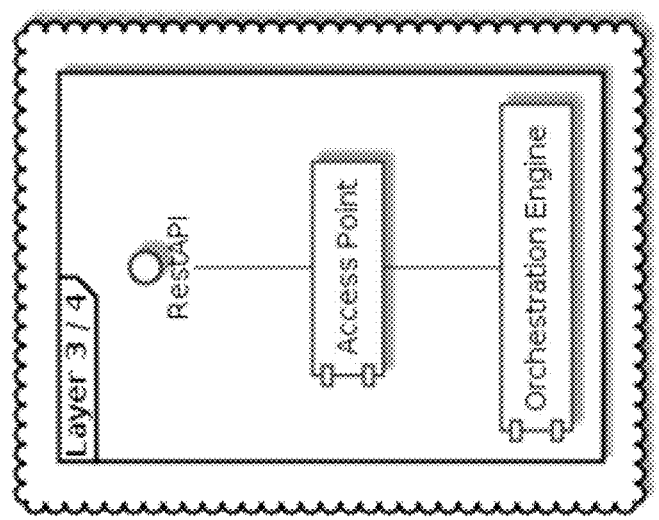
FIG. 14 illustrates an embedded orchestration engine that spans Layer 3 and Layer 4 of the multi-layer application management architecture of FIG. 9.

In some embodiments, the outer orchestration engine may be replaced with an embedded orchestration engine that spans Layer 3 and Layer 4, as illustrated in FIG. 14. As illustrated in the figure, the AMS in such an embodiment tightly integrates a Layer 4 outer orchestration engine behind the Layer 3 access point.

FIG. 15 illustrates one possible embodiment of an example user interface of Layer 5, the presentation layer.

The user interface (UI) of the AMS is configured to expose all management functions of the AMS in the most usable way. It presents a single point of entry for all AMS actors ("single pane of glass").

The UI may be configured to support, for example, a service catalog for blueprint deployment, authoring of proto Blueprints and L4 scripts, execution of L4 scripts as well as L3 system operations, and graphical representation of the SuC topologies.

The following are examples of additional functional features of a given UI of Layer 5:

5.1: The UI is securely accessible via https.

5.2: The UI can propagate or map user credentials to the Layer 3 and/or Layer 4 access points.

5.3: The UI supports all standard web browsers (e.g., Google Chrome, Microsoft Internet Explorer, Firefox, Apple Safari).

5.4: The UI is suitable for use on a PC as well as mobile devices (e.g., tablets, smart phones).

5.5: The UI is directly accessible via Internet (e.g., no VPN required).

5.6: The UI is securely connected to Layer 4 and Layer 3.

5.7: The UI provides a user role concept so that it will only present to a logged-in user those XuCs, L4 scripts and L3 operations for which the user is assigned the appropriate role.

The particular layers, characteristics, features and other system functionality described in conjunction with the diagrams of FIGS. 2 through 15 are presented by way of illustrative example only, and should not be construed as limiting the scope of the invention in any way. Alternative embodiments can use other types and arrangements of components to implement a multi-layer architecture for application management. For example, additional or alternative characteristics or other features can be provided for each of one or more of the layers of the multi-layer architecture in other embodiments.

It is also to be appreciated that application management functionality such as that described in conjunction with the diagrams of FIGS. 2 through 15 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments can provide considerable advantages over conventional application management arrangements.

For example, challenges associated with deployment of multiple distinct applications for multiple tenants in hybrid multi-tenant clouds can be advantageously avoided through the use of an application manager configured in accordance with a multi-layer application management architecture as disclosed herein.

A multi-layer application management architecture in one or more illustrative embodiments can be used as a reference architecture for a wide variety of different application management solutions.

Such a reference architecture provides completeness along multiple dimensions of application automation. For example, it covers a full stack of potentially complex application systems, including infrastructure, OS and application, through integration of specialized Layer 1 controllers that operate on all these levels.

The multi-layer architecture in some embodiments accommodates the potentially complex nature of enterprise-grade applications such as SAP NetWeaver or others by providing a dedicated layer in the architecture that is in charge of properly modeling the topology and dependencies of such systems while still being application product agnostic.

The multi-layer architecture in some embodiments supports blueprint-based application provisioning and/or disposal, as well as additional functionality such as in-life management operations including system monitoring, configuration and/or change management.

The multi-layer architecture in some embodiments provides services for atomic operations, including inherently orchestrated operations as well as operations using explicitly engineered workflow-like orchestration.

The multi-layer architecture in some embodiments provides a service for providing credentials to controlling components.

The multi-layer architecture in some embodiments formulates functional requirements that can be used to develop microservices for highly modular and flexible application management products.

The multi-layer architecture in some embodiments provides multiple extension points in respective ones of the layers, resulting in a highly-extensible platform. Such layers can be used, for example, to extend an application management solution through the use of 3rd party implementations.

The multi-layer architecture can provide further advantages in terms of non-functional product quality criteria such as those defined in ISO 25010.

It is to be appreciated that the foregoing advantages are illustrative of advantages provided in certain embodiments, and need not be present in other embodiments.

As mentioned previously, at least portions of the information processing system 100 may be implemented using one or more processing platforms. Illustrative embodiments of such platforms will now be described in greater detail. Although described in the context of system 100, these platforms may also be used to implement at least portions of other information processing systems in other embodiments of the invention.

Figure 16:
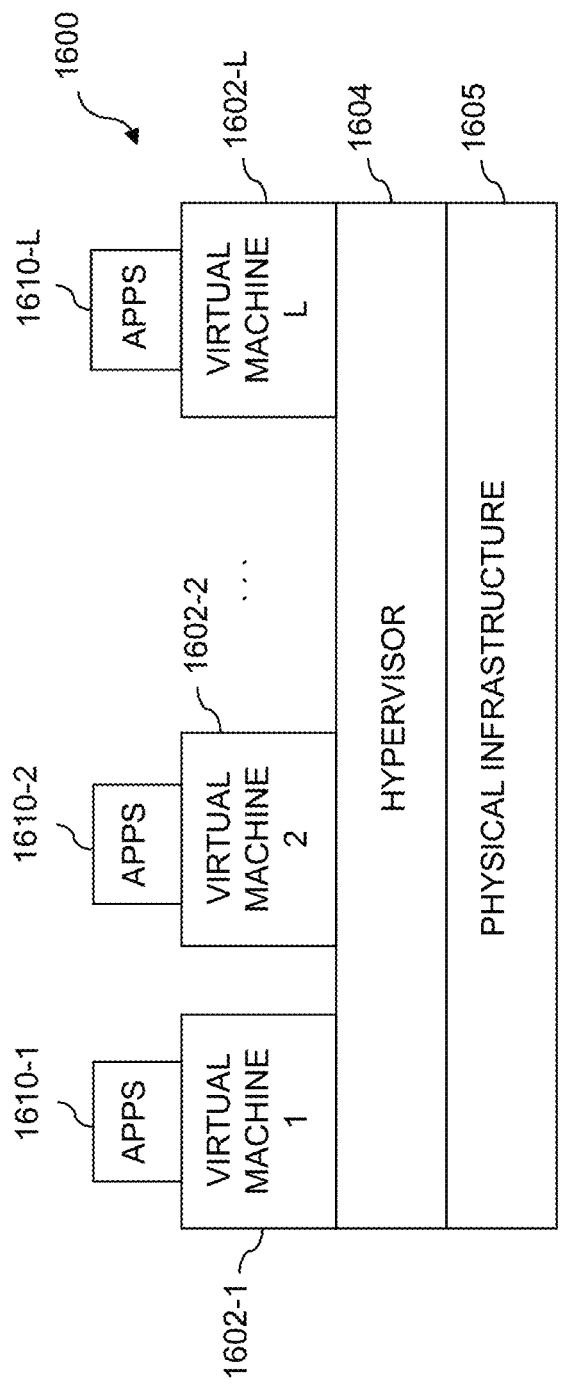
FIGS. 16 and 17 show examples of processing platforms that may be utilized to implement at least a portion of a cloud-based information processing system such as the information processing system of FIG. 1.
Figure 17:
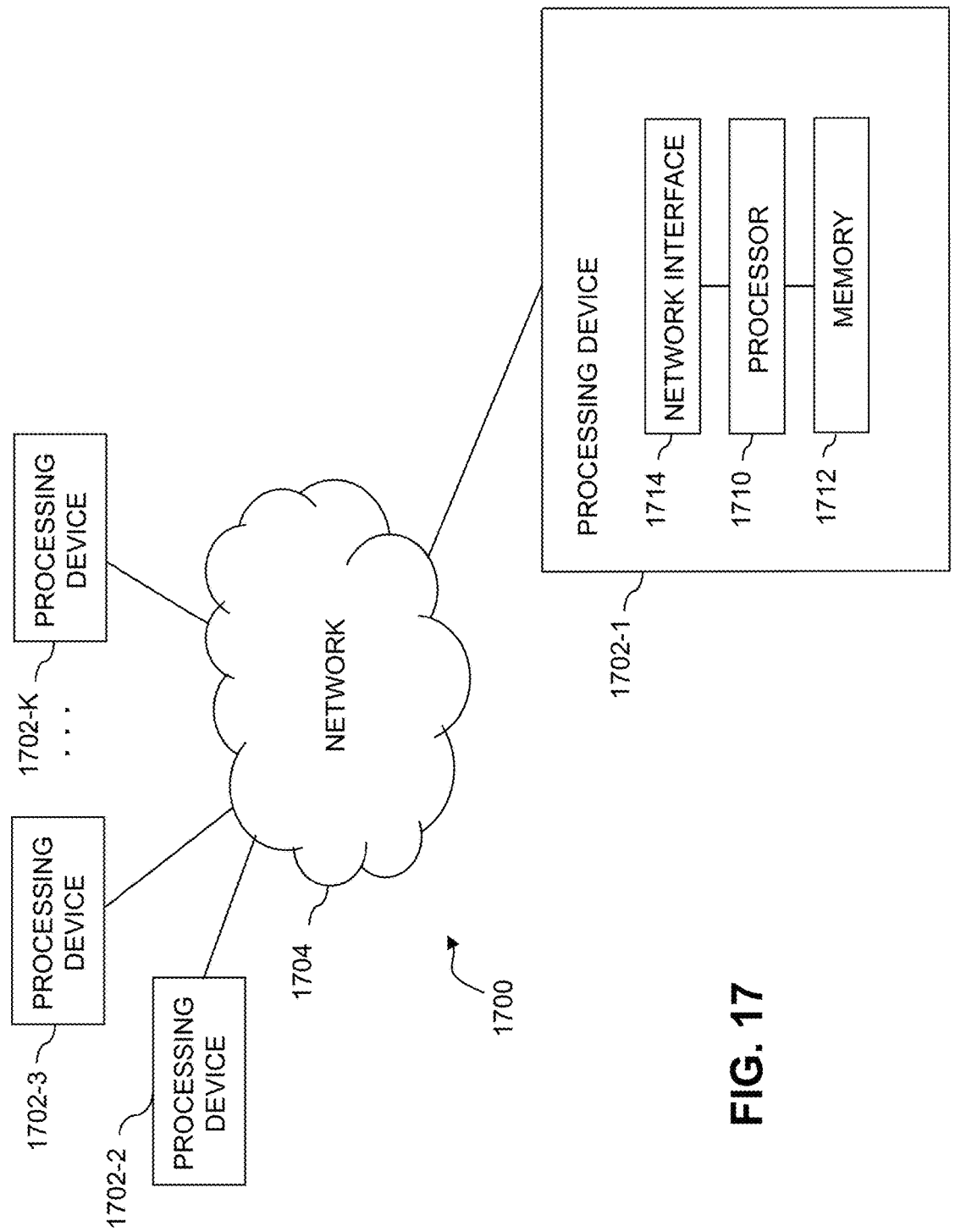

FIG. 16 shows an example processing platform comprising cloud infrastructure 1600. The cloud infrastructure 1600 comprises a combination of physical and virtual processing resources that may be utilized to implement at least a portion of the information processing system 100. The cloud infrastructure 1600 comprises virtual machines (VMs) 1602-1, 1602-2, . . . 1602-L implemented using a hypervisor 1604. The hypervisor 1604 runs on physical infrastructure 1605. The cloud infrastructure 1600 further comprises sets of applications 1610-1, 1610-2, . . . 1610-L running on respective ones of the virtual machines 1602-1, 1602-2, . . . 1602-L under the control of the hypervisor 1604.

Although only a single hypervisor 1604 is shown in the embodiment of FIG. 16, the information processing system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 1604 and possibly other portions of the information processing system 100 in one or more embodiments of the invention is the VMware® vSphere® which may have an associated virtual infrastructure management system such as the VMware® vCenter™. The underlying physical machines may comprise one or more distributed processing platforms that include one or more storage systems.

Such storage systems can comprise any of a variety of different types of storage including network-attached storage (NAS), storage area networks (SANs), direct-attached storage (DAS) and distributed DAS, as well as combinations of these and other storage types, including software-defined storage.

Particular types of storage products that can be used in implementing a given storage system in an illustrative embodiment include VNX® and Symmetrix VMAX® storage arrays, software-defined storage products such as ScaleIO™ and ViPR®, flash-based storage arrays such as DSSD™, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators in the S-Series, X-Series and NL-Series product lines, all from EMC Corporation. Combinations of multiple ones of these and other storage products can also be used in implementing a given storage system in an illustrative embodiment.

One or more of the processing modules or other components of system 100 may therefore each run on a computer, server, storage device or other processing platform element. A given such element may be viewed as an example of what is more generally referred to herein as a "processing device." The cloud infrastructure 1600 shown in FIG. 16 may represent at least a portion of one processing platform. Another example of such a processing platform is processing platform 1700 shown in FIG. 17.

The processing platform 1700 in this embodiment comprises a portion of system 100 and includes a plurality of processing devices, denoted 1702-1, 1702-2, 1702-3, . . . 1702-K, which communicate with one another over a network 1704.

The network 1704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1702-1 in the processing platform 1700 comprises a processor 1710 coupled to a memory 1712.

The processor 1710 may comprise a microprocessor, a microcontroller, an ASIC, a field-programmable gate array (FPGA) or other type of processing circuitry, as well as portions or combinations of such circuitry elements.

The memory 1712 may comprise random access memory (RAM), read-only memory (ROM) or other types of memory, in any combination. The memory 1712 and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1702-1 is network interface circuitry 1714, which is used to interface the processing device with the network 1704 and other system components, and may comprise conventional transceivers.

The other processing devices 1702 of the processing platform 1700 are assumed to be configured in a manner similar to that shown for processing device 1702-1 in the figure.

Again, the particular processing platform 1700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure, in place of or in addition to virtualization infrastructure comprising virtual machines. Such virtualization infrastructure illustratively includes container-based virtualization infrastructure configured to provide the above-noted Docker containers or other types of LXCs.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

It should again be emphasized that the above-described embodiments of the invention are presented for purposes of illustration only. Many variations and other alternative embodiments may be used. For example, the disclosed techniques are applicable to a wide variety of other types of information processing systems in which it is desirable to provide efficient management of applications in hybrid multi-tenant clouds and other types of cloud-based information processing systems. Also, the particular configurations of system components shown in the figures can be varied in other embodiments. Thus, for example, the particular types of processing platforms, application managers, multi-layer architectures, controllers, engines and controlled components deployed in a given embodiment and their respective configurations may be varied. Moreover, the various assumptions made above in the course of describing the illustrative embodiments should also be viewed as examples rather than as requirements or limitations of the invention.

Numerous other alternative embodiments within the scope of the appended claims will be readily apparent to those skilled in the art.

TABLE 1

Actors and Organizational Units Appendix

| Role | CSP | MSP | Tenant |
|---|---|---|---|
| Operator | Monitors Cloud Infrastructure availability, performance and security; resolves service tickets following defined processes | Monitors Applications and all provided services; resolves service tickets following defined processes | Tenant's internal IT (may act as internal MSP operator) |
| Administrator | Provisions/disposes and configures infrastructural components of the cloud | Provisions/disposes and configures hosts and application components | Tenant's internal IT (may act as internal MSP administrator) |
| Credentials Administrator | Manages the credentials used for infrastructural components | Manages the credentials used for hosts and application components | Tenant's internal IT (may act as internal MSP credentials administrator) |
| Automation Engineer | Develops and deploys scripts or other tools or workflows to automate infrastructure management processes | Develops and deploys scripts or other tools or workflows to automate application management processes | Tenant's internal IT (may act as internal MSP automation engineer) |
| Account Manager | Manages the Tenant Account from CSP perspective | Manages the Tenant Account from MSP perspective | — |
| IT Business Manager | Accountable for all provided CSP services including financial aspects | Accountable for all provided MSP services including financial aspects | Tenant's internal IT, counterpart of MSP/CSP Business and Account Managers |
| End User | — | — | Consumes the provided applications; Need to be informed about maintenance, outages, etc. |
| Auditor | Audits security and compliance of CSP's infrastructure | Audits security and compliance of MSP's provided services | Audits all IT services (internal and external) |

TABLE 2

Example AMS Core Features

| Feature | Actor(s) | Functional Details |
|---|---|---|
| OS and Application Monitoring | Operator (Tenant/MSP) | Availability Monitoring Performance Monitoring Health Monitoring License Monitoring Backup Monitoring |
| OS and Application Configuration | Administrator (Tenant/MSP) | Controls for OS Configuration (such as filesystems, network, IPTABLES) Controls for Application Configuration |
| OS and Application Root Cause Analysis | Operator (Tenant/MSP)/ Administrator (Tenant/MSP) | View running processes (Hypervisor, OS, Application) Drill down into error logs of OS and Applications |
| OS and Application Launch/Shutdown | Operator (Tenant/MSP)/ Administrator (Tenant/MSP) | Controls for orchestrated launch and shutdown of Application Systems, components and hosts |
| OS and Application Provisioning and Disposal | Administrator (Tenant/MSP) | Blueprint based deployment of hosts and/or applications into the Tenant infrastructure VM Template based deployment Unattended installation of software Consistent removal of all components and hosts when a system is decommissioned |
| Registration of existing systems | Administrator (Tenant/MSP) | Blueprint based registration of compatible systems that exists prior to the rollout of the AMS |
| Infrastructure Consumption Monitoring | Account Manager (MSP) IT Business (Tenant) | Aggregation of consumed infrastructure services to application system level |
| Action Scheduler | Operator (Tenant/MSP)/ Administrator (Tenant/MSP) | Scheduling of one-time or recurrent executions of actions via Application/OS controls |
| Credentials Management | Credentials Administrator (Tenant/MSP) | Secure credentials provider for the credentials required to execute operations on controlled components Credentials Manager |
| Automation Workflow | Automation Engineer (Tenant/MSP) | Allows to design, build and test automation workflows |
| Audit Reporting | Auditor | Access and actions logs System configuration parameters |
| Multi-Tenancy/ Hybridity | All users | Secure Request Routing of Actions to Controlled components For separated tenants To different sites (public/private) |
| Integration of 3$^{rd}$ Party Operational Tools | Operator (Tenant/MSP)/ Administrator (Tenant/MSP) | |
| Secure API access | External System/ UI Layer | SAML2 based authentication for integration with external systems |

TABLE 3

Example AMS Additional Features

| Feature | Actor(s) | Functional Details |
|---|---|---|
| SLA Monitoring | Account Manager (MSP) IT Business (Tenant) | |
| Blueprint Design | Automation Engineer | UI for the graphical development of (Proto) Blueprints |
| Autonomous Operations | Automation Engineer (develops these autonomous workflows) | Autohealing Autoscaling |
| OS and Application User Management | Operator (Tenant/MSP)/ Administrator (Tenant/MSP) | Controls for management of OS Users and Groups Controls for management of Application Users, Roles and Groups |
| OS and Application Job | Operator (Tenant/MSP)/ Administrator | E.g. Controls for Linux Cron-Tab or SAP Batch Jobs |

TABLE 3-continued

Example AMS Additional Features

| Feature | Actor(s) | Functional Details |
|---|---|---|
| Management OS and Application License Management | (Tenant/MSP) Administrator (Tenant/MSP) | |
| Application Interface Management | Administrator (Tenant/MSP) | E.g. Management of SAP RFC destinations |
| System Copy/ Refresh | Administrator (Tenant/MSP) | Copy of an application system to a new system or refresh of an existing system with the data of another system |

TABLE 4

Example Controllable Targets

| Target under Control | XuC Example | Controllables |
|---|---|---|
| Host (OS) | Linux | Linux Filesystem, Linux User |
| System Component | HANA DB | Backup, Schema User |
| System | SAP NetWeaver System ABAP | SAP Client (tenant, "Mandant"), SAP User, SAP Job |
| System | Compute/Storage (IaaS) | VM, VDisk |

TABLE 5

Example Atomic Operations

| Type | Example |
|---|---|
| *State-changing/querying Operations* | |
| Create | install an application, create an SAP user, schedule (=create) an SAP job, create a port forwarding rule |
| Copy | deploy a VM from VM template, copy an SAP client ("Mandant"), create a disk snapshot |
| Delete | delete a VM, delete an SAP user |
| Start | power on a VM, start an SAP instance, activate an OS service |
| Stop | power off a VM, stop an SAP instance, deactivate an OS service |
| Restart | restart an SAP instance (stop + start in one atomic operation) |
| ReleaseTask | this is used for cases where the controllable target is a task or job machine, for example the SAP Job Scheduler: release an SAP job |
| CancelTask | this is used for cases where the controllable target is a task or job machine, for example the SAP Job Scheduler: cancel an SAP job |
| Query State | query the state of an SAP user (could be: absent, enabled, disabled) |
| Query-Components | list the states of all non-absent controllable components of the target, for example the list of all existing clients (Mandanten) in an SAP ABAP system (SUC) |
| *Parameter-changing/querying Operations* | |
| SetParameter | change the default client parameter of an SAP instance, change the RAM size |

TABLE 5-continued

Example Atomic Operations

| Type | Example |
|---|---|
| | of a VM, change size of virtual disk |
| QueryParameter | query the default client parameter of an SAP instance, query the RAM size of a VM |
| *Other Operations* | |
| Query Sensor | monitor the health of an SAP instance, monitor the RAM utilization of a host |
| Execute | "catch all" operation for the arbitrary execution of programs, scripts etc. on XuCs |
| Import | restore a data set from a backup, import an SAP transport, import an SAP support package, import an SAP note into an SAP system, import a new SAP Kernel (=kernel upgrade) |
| Export | create a backup (seen as "export" of a data set), export an SAP client (Mandant) to the transport directory |

TABLE 6

Layers Contributing to Example AMS Core Features

| Feature | L1 | L2 | L3 | L4 | L5 |
|---|---|---|---|---|---|
| OS and Application Monitoring | B | B | | | UI |
| OS and Application Configuration | B | B | | | UI |
| OS and Application Root Cause Analysis | B | B | | | UI |
| OS and Application Launch/Shutdown | B | B | | | UI |
| OS and Application Provisioning and Disposal | B | B | | | UI |
| Registration of existing systems | | B | | | UI |
| Infrastructure Consumption Monitoring | B | B (CMP) | | | UI |
| Action Scheduler | | | B | | UI |
| Credentials Management | | B | | B | UI |
| Automation Workflow | | B | | B | UI |
| Audit Reporting | | | B | | UI |
| Multi-Tenancy/Hybridity | | B | | | |
| Integration of 3$^{rd}$ Party Operational Tools | | B | | | |

TABLE 7

Example Product Quality Enhancements

| Main Quality Aspect | Criteria | Effect |
|---|---|---|
| Functional Suitability | Functional Completeness degree to which the set of functions covers all the specified tasks and user objectives | All kinds of applications can be managed, e.g., if the AMS covers the application natively or through extension point 1 Provisioning and In-life Management is in scope Workflows and Blueprints allow Automation Engineer to enhance the solution |
| | Functional Correctness degree to which a product or system provides the correct results with the needed | Modular architecture allows for better testability and therefore tends to lead to higher degree of correctness |

TABLE 7-continued

Example Product Quality Enhancements

| Main Quality Aspect | Criteria | Effect |
|---|---|---|
| | degree of precision | |
| | Functional Appropriateness degree to which the functions facilitate the accomplishment of specified tasks and objectives | Application-centric solution (Layer 2) Complete stack of Applications is covered (Layer 1) System complexity is appropriately considered (Layer 2) |
| Compatibility | Interoperability degree to which two or more systems, products or components can exchange information and use the information that has been exchanged | APIs on Layers 1,2,3,4 Integration of $3^{rd}$ party management systems |
| Security | Confidentiality degree to which a product or system ensures that data are accessible only to those authorized to have access | Layer 3 implements authorization of AMS users |
| | Authenticity degree to which the identity of a subject or resource can be proved to be the one claimed | Layer 3 implements authentication of AMS users |
| | Accountability degree to which the actions of an entity can be traced uniquely to the entity | Layer 3 implements logging of all operations |
| Usability | Operability degree to which a product or system has attributes that make it easy to operate and control | UI is Internet accessible UI works on mobile devices |
| Reliability | Availability degree to which a system, product or component is operational and accessible when required for use | All layers run components on redundant servers for high availability |
| Maintainability | Modularity degree to which a system or computer program is composed of discrete components such that a change to one component has minimal impact on other components | Reference architecture is highly modular |
| | Reusability degree to which an asset can be used in more than one system, or in building other assets | Component and Outer Controllers can be reused in different products |
| | Analyzability degree of effectiveness and efficiency with which it is possible to assess the impact on a product or system of an intended change to one or more of its parts, or to diagnose a product for deficiencies or causes of failures, or to identify parts to be modified | Clear segregation of duties of components on the different layers allow for easier analysis of change impacts or product issues |
| | Testability degree of effectiveness and efficiency with which test criteria can be established for a system, product or component and tests can be performed to determine whether those criteria have been met | Components with clear, restricted scope enhance testability Mocking of Layer n can be used for continuous testing on Layer n + 1 |

What is claimed is:

1. An apparatus comprising:
a processing platform comprising a plurality of processing devices each comprising a processor coupled to a memory;
the processing platform being configured to implement virtual resources of one or more clouds for use by applications of a plurality of application management domains utilized by a plurality of tenants;
wherein the processing platform further comprises an application manager configured in accordance with a multi-layer application management architecture including at least:
a component control layer;
a system control and inner orchestration layer;
an access and routing layer;
an external system orchestration layer; and
a presentation layer;
wherein the virtual resources and applications comprise respective controlled components under control of the component control layer;
wherein the applications are managed utilizing interactions between the layers of the multi-layer application management architecture;
wherein the system control and inner orchestration layer comprises at least one inner orchestration engine configured to interact with a plurality of controllers of the component control layer in order to provide services that utilize controlled components of at least one system under control for a given one of the plurality of application management domains associated with at least a given one of the plurality of tenants;
wherein the access and routing layer implements a set of functions for executing operations in the system control and inner orchestration layer on behalf of different ones of the plurality of tenants associated with different ones of the plurality of application management domains each having a different inner orchestration engine within the system control and inner orchestration layer; and
wherein the external system orchestration layer comprises at least one outer orchestration engine that executes operations in the system control and inner orchestration layer across multiple ones of the plurality of tenants via the access and routing layer.

2. The apparatus of claim 1 wherein the virtual resources comprise compute, storage and network resources associated with one or more host devices.

3. The apparatus of claim 2 wherein the component control layer comprises:
at least one infrastructure controller configured to control the compute, storage and network resources;
at least one operating system controller configured to control an operating system of at least one of the host devices; and
a plurality of application controllers configured to control respective ones of the applications.

4. The apparatus of claim 2 wherein the virtual resources comprise different sets of compute, storage and network resources for different ones of a plurality of clouds and the component control layer comprises a separate infrastructure controller for each of the different clouds.

5. The apparatus of claim 2 wherein one or more of the controllers are each configured to permit execution of actions on its associated controlled components via an application programming interface.

6. The apparatus of claim 1 wherein the system control and inner orchestration layer comprises a plurality of system model instances implemented for respective ones of a plurality of tenants of at least one of the clouds.

7. The apparatus of claim 1 wherein the inner orchestration engine is configured to operate in accordance with a corresponding system model instance.

8. The apparatus of claim 1 wherein the inner orchestration engine is associated with a credentials provider configured to store credentials required to access controlled components within a particular application management domain of the inner orchestration engine.

9. The apparatus of claim 1 wherein the system control and inner orchestration layer comprises a plurality of inner orchestration engines each associated with a different one of the plurality of application management domains.

10. The apparatus of claim 1 wherein the access and routing layer comprises:
at least one access point of an application programming interface;
a request scheduler; and
a request router.

11. The apparatus of claim 1 wherein the presentation layer provides a user interface that is accessible to a user device over a network.

12. A cloud-based information processing system comprising the apparatus of claim 1.

13. A method comprising:
providing virtual resources of one or more clouds for use by applications of a plurality of application management domains utilized by a plurality of tenants; and
managing the applications in accordance with a multi-layer application management architecture comprising at least:
a component control layer;
a system control and inner orchestration layer;
an access and routing layer;
an external system orchestration layer; and
a presentation layer;
wherein the virtual resources and applications comprise respective controlled components under control of the component control layer;
wherein the applications are managed utilizing interactions between the layers of the multi-layer application management architecture;
wherein the system control and inner orchestration layer comprises at least one inner orchestration engine configured to interact with a plurality of controllers of the component control layer in order to provide services that utilize controlled components of at least one system under control for a given one of the plurality of application management domains associated with at least a given one of the plurality of tenants;
wherein the access and routing layer implements a set of functions for executing operations in the system control and inner orchestration layer on behalf of different ones of the plurality of tenants associated with different ones of the plurality of application management domains each having a different inner orchestration engine within the system control and inner orchestration layer; and
wherein the external system orchestration layer comprises at least one outer orchestration engine that executes operations in the system control and inner orchestration layer across multiple ones of the plurality of tenants via the access and routing layer; and
wherein the method is performed in at least one processing platform comprising a plurality of processing devices each comprising a processor coupled to a memory.

14. The method of claim 13 wherein the system control and inner orchestration layer comprises a plurality of inner orchestration engines each associated with a different one of the plurality of application management domains.

15. A computer program product comprising a non-transitory processor-readable storage medium having stored therein program code of one or more software programs, wherein the program code when executed by at least one processing platform comprising a plurality of processing devices causes the processing platform:
to provide virtual resources of one or more clouds for use by applications of a plurality of application management domains utilized by a plurality of tenants; and
to manage the applications in accordance with a multi-layer application management architecture comprising at least:
a component control layer;
a system control and inner orchestration layer;
an access and routing layer;
an external system orchestration layer; and
a presentation layer;
wherein the virtual resources and applications comprise respective controlled components under control of the component control layer;
wherein the applications are managed utilizing interactions between the layers of the multi-layer application management architecture;
wherein the system control and inner orchestration layer comprises at least one inner orchestration engine configured to interact with a plurality of controllers of the component control layer in order to provide services that utilize controlled components of at least one system under control for a given one of the plurality of application management domains associated with at least a given one of the plurality of tenants;
wherein the access and routing layer implements a set of functions for executing operations in the system control and inner orchestration layer on behalf of different ones of the plurality of tenants associated with different ones of the plurality of application management domains each having a different inner orchestration engine within the system control and inner orchestration layer; and
wherein the external system orchestration layer comprises at least one outer orchestration engine that executes operations in the system control and inner orchestration layer across multiple ones of the plurality of tenants via the access and routing layer.

16. The computer program product of claim 15 wherein the system control and inner orchestration layer comprises a plurality of inner orchestration engines each associated with a different one of the plurality of application management domains.

17. The method of claim 13 wherein the system control and inner orchestration layer comprises a plurality of system model instances implemented for respective ones of a plurality of tenants of at least one of the clouds.

* * * * *